(12) United States Patent
Hamada

(10) Patent No.: US 7,877,778 B2
(45) Date of Patent: Jan. 25, 2011

(54) INFORMATION PROCESSING SYSTEM, INFORMATION PROCESSING METHOD, RECEIVING APPARATUS, RECEIVING METHOD, DATA GENERATING UNIT, DATA GENERATING METHOD, AND PROGRAM

(75) Inventor: Kazunori Hamada, Tokyo (JP)

(73) Assignee: Sony Corporation (JP)

( * ) Notice: Subject to any disclaimer, the term of this patent is extended or adjusted under 35 U.S.C. 154(b) by 946 days.

(21) Appl. No.: 11/520,396

(22) Filed: Sep. 13, 2006

(65) Prior Publication Data

US 2007/0204293 A1    Aug. 30, 2007

(30) Foreign Application Priority Data

Sep. 14, 2005    (JP)    ............ P2005-267108

(51) Int. Cl.
H04N 7/173    (2006.01)
H04N 7/16    (2006.01)
(52) U.S. Cl. ............... 725/132; 725/142; 725/152
(58) Field of Classification Search ............ 725/132, 725/142, 152
See application file for complete search history.

(56) References Cited

U.S. PATENT DOCUMENTS 7,051,325 B2 *    5/2006    Choi et al. ............... 717/168

FOREIGN PATENT DOCUMENTS

| JP | 2002-112133 A | 4/2002 |
|---|---|---|
| JP | 2004-350217 A | 12/2004 |
| JP | 2004-356697 A | 12/2004 |
| JP | 2005-142751 A | 6/2005 |
| WO | 2005-048604 A1 | 5/2005 |

OTHER PUBLICATIONS

Receiver for Digital Broadcasting standard, ARIB STD-B21, version 4.0, Download Functions, Association of Radio Industries and Business, Feb. 6, 2003, p. 120 and p. 178. (Upon information and belief no English language translation of the reference is avalibale, and therefore the first eighteen pages and the last page of the English language version of ARIB STD-B21 V 4.6 is submitted as an English language summary of ARIB STD-B21 V 4.0.).

* cited by examiner

*Primary Examiner*—Hunter B Lonsberry
(74) *Attorney, Agent, or Firm*—Lerner, David, Littenberg, Krumholz & Mentlik, LLP

(57) ABSTRACT

An information processing system includes a receiving apparatus receiving a broadcast signal; and a data generating unit creating notice information relating to download for update data multiplexed with the broadcast signal for transmission and updating software in the receiving apparatus. The data generating unit includes a device operable to describe a prescribed model ID defined by a predetermined standard in the notice information and to describe an extended model ID used in combination with the prescribed model ID in the notice information; and a device operable to generate the notice information having the IDs described. The receiving apparatus includes a device operable to determine whether the prescribed model ID matches an owned prescribed model ID; a device operable to determine whether the extended model ID matches the owned extended model ID when the prescribed model ID is so determined; and a device operable to acquire update data when the extended model ID is so determined.

19 Claims, 15 Drawing Sheets

FIG. 8 private_data_type (8 BITS): PRIVATE DATA ID FOR EXTENDED MODEL IDENTIFICATION private_data_type_length (8 BITS): DATA BYTE LENGTH FOR EXTENDED MODEL IDENTIFICATION sub_model_id (8 BITS): EXTENDED MODEL ID

FIG. 9

| | DATA STRUCTURE | bit | VALUE | DESCRIPTIONS |
|---|---|---|---|---|
| | table_id | 8 | 0xC3 | table_id OF SDTT |
| | section_syntax_indicator | 1 | 1 | DATA WHICH DESCRIBES "1" |
| | reserved_future_use | 1 | 1 | DATA WHICH DESCRIBES "1" |
| | reserved | 2 | 11 | DATA WHICH DESCRIBES "11" |
| | section_length | 12 | 0x**** | SECTION LENGTH (LENGTH TO CRC_32) |
| | table_id_ext | 8 | 0x** | maker_id (MAKER ID) |
| | | 8 | 0x** | maker_id (MAKER ID) |
| | reserved | 2 | 11 | DATA WHICH DESCRIBES "11" |
| FILTERABLE AREA | version_number | 5 | ***** | DATA WHICH INCREMENTS THE NUMBER ONE BY ONE FROM ONE FOR EVERY UPDATE |
| | current_next_indicator | 1 | 0 | not yet applicable |
| | | | 1 | currency applicable |
| | section_number | 8 | 0x00 | DATA WHICH DESCRIBES "0x00" |
| | last_section_number | 8 | 0x** | DATA WHICH DESCRIBES THE LAST SECTION NUMBER (USUALLY "00") |
| | transport_stream_id | 16 | 0x**** | TS ID |
| | original_network_id | 16 | 0x**** | NETWORK ID OF ORIGINAL DISTRIBUTION SYSTEM |
| | service_id | 16 | 0x**** | SERVICE ID TO WHICH SOFTWARE CONTENTS ARE TRANSMITTED |
| | num_of_contents | 8 | 0x** | THE NUMBER OF SOFTWARE NOTIFIED BY THIS TABLE |
| | [Loop] | | | |
| | group | 4 | 0x* | DATA WHICH STORES group_id |
| | target_version | 12 | 0x*** | VERSION NUMBER OF SOFTWARE FOR UPDATE TARGET |
| | new_version | 12 | 0x*** | VERSION NUMBER OF SOFTWARE TO BE DOWNLOADED THIS TIME |
| | download_level | 2 | 00 | RANDOM DOWNLOAD |
| | | | 01 | COMPULSORY DOWNLOAD |

FIG. 10

| | | | |
|---|---|---|---|
| version_indicator | 2 | 00 | DATA WHICH INDICATES THAT THE TARGETS ARE ALL THE VERSIONS (VERSION SPECIFICATION IS INVALID) |
| | | 01 | DATA WHICH INDICATES THAT TARGETS ARE THE SPECIFIED VERSION OR LATER |
| | | 10 | DATA WHICH INDICATES THAT TARGETS ARE THE SPECIFIED VERSION OR BEFORE |
| | | 11 | DATA WHICH INDICATES THAT TARGETS ARE ONLY FOR THE SPECIFIED VERSION |
| content_description_length | 12 | 0x*** | NUMBER OF TOTAL BYTES OF SCHEDULE LOOP AND DESCRIPTOR LOOP |
| reserved | 4 | 0xF | DATA WHICH DESCRIBES "1" FOR ALL |
| shecule_description_length | 12 | 0x**** | NUMBER OF BYTES OF SCHEDULE LOOP DOWNLOAD CONTENTS ARE TRANSMITTED IF THIS VALUE IS 0 |
| reserved | 4 | 0xF | DATA WHICH DESCRIBES "1" FOR ALL |
| (Loop) | | | |
| start_time | 40 | 0x********** | DATA WHICH INDICATES THE START TIME FOR DOWNLOAD DISTRIBUTION BY JST AND MJD |
| duration | 24 | 0x****** | DURATION FOR DISTRIBUTION |
| (Loop) | | | |
| descriptors() | | | 0xC9 DOWNLOAD CONTENTS DESCRIPTOR |
| CRC_32 | 32 | | |

FIG. 11

| DATA STRUCTURE | bit | VALUE | DESCRIPTIONS |
|---|---|---|---|
| descriptor_tag | 8 | 0xC9 | TAG VALUE OF DOWNLOAD CONTENTS DESCRIPTOR |
| descriptor_length | 8 | 0x** | LENGTH OF THIS DESCRIPTOR |
| reboot | 1 | 0 | DATA FOR CONTINUOUS OPERATION AFTER DOWNLOAD IS FINISHED |
|  | 1 | 1 | DATA FOR REBOOT AFTER DOWNLOAD IS FINISHED |
| add_on | 1 | 0 | DATA WHICH REWRITES EXISTING MODULES |
|  | 1 | 1 | ADDITION TO EXISTING MODULES |
| compatibility_flag | 1 | 0 | WITH NO compatibility_descriptor() |
|  | 1 | 1 | WITH compatibility_descriptor() |
| module_info_flag | 1 | 0 | WITH NO INFORMATION FOR EVERY MODULE |
|  | 1 | 1 | WITH INFORMATION FOR EVERY MODULE |
| text_info_flag | 1 | 0 | WITH NO SERVICE DESCRIPTION AT THE TAIL |
|  | 1 | 1 | WITH SERVICE DESCRIPTION AT THE TAIL |
| reserved | 3 | 111 | DATA WHICH DESCRIBES "1" |
| component_size | 32 | 0x******** | SUM OF DATA SIZE BY CAROUSEL TRANSMISSION (UNITS OF BYTES) |
| download_id | 32 | 0x******** | ID WHICH IDENTIFIES DOWNLOAD ACCEPTANCE NUMBER |
| time_out_value_DII | 32 | 0x******** | TIMEOUT VALUE RECOMMENDED FOR RECEPTION OF ALL SECTIONS OF CAROUSEL DII OF INTEREST |
| leak_rate | 22 | ,0x*** | LEAK RATE OF TS BUFFER OF RECEIVER (UNIT OF 50 BYTES) |
| reserved | 2 | 11 | DATA WHICH DESCRIBES "1" |
| component_tag | 8 | ** | COMPONENT TAG VALUE OF THE CORRESPONDING STREAM WHICH IS GIVEN BY PMT STREAM DESCRIPTOR |
| [compatibility_flag = 1] |  |  |  |
| compatibility_descriptor() |  |  | TOTALLY EQUIVALENT TO INSIDE DDI |
| [module_info_flag = 1] |  |  |  |

FIG. 12

| | | | |
|---|---|---|---|
| num_of_modules | 16 | *** | NUMBER OF MODULES |
| [Loop] | | | |
| module_id | 16 | **** | MODULE ID FOR USE IN DATA TRANSMISSION IN DOWNLOAD |
| module_size | 32 | ******** | BYTE LENGTH OF MODULE OF INTEREST |
| module_info_length | 8 | ** | BYTE LENGTH OF module_info_byte |
| (Loop) | | | |
| module_info_byte | 8 | | NECESSARY DESCRIPTOR AMONG TYPE DESCRIPTOR, NAME DESCRIPTOR AND INFO DESCRIPTOR DESCRIBED BY DII |
| private_data_length | 8 | ** | BYTE LENGTH OF private_data_byte |
| [Loop] | | | |
| private_data_byte | 8 | | OUT OF SPECIFICATIONS |
| [text_info_flag = 1] | | | |
| ISO_639_language_code | 24 | ****** | DATA WHICH IDENTIFIES LANGUAGE OF CHARACTER DESCRIPTION USED IN SERVICE DESCRIPTION |
| text_length | 8 | ** | BYTE LENGTH OF SERVICE DESCRIPTION |
| (Loop) | | | |
| text_char | 8 | | DESCRIPTION RELATED TO SERVICE OF DOWNLOAD SOFTWARE TO BE TRANSMITTED |

INFORMATION PROCESSING SYSTEM, INFORMATION PROCESSING METHOD, RECEIVING APPARATUS, RECEIVING METHOD, DATA GENERATING UNIT, DATA GENERATING METHOD, AND PROGRAM

CROSS-REFERENCE TO RELATED APPLICATIONS

The present application claims priority from Japanese Patent Application No. JP2005-267108 filed on Sep. 14, 2005, the disclosure of which is hereby incorporated by reference herein.

BACKGROUND OF THE INVENTION

1. Field of the Invention

The present invention relates to an information processing system and an information processing method, a receiving apparatus and a receiving method, a data generating unit and a data generating method, and a program, particularly to an information processing system and an information processing method, a receiving apparatus and a receiving method, a data generating unit and a data generating method, and a program, which can suppress the risk that IDs to identify models of a receiving apparatus may be used up to make it impossible to identity the models defined by a predetermined standard even though the models of a receiving apparatus are increased in the market.

2. Description of the Related Art

As shown in Receiver for Digital Broadcasting standard, ARIB STD-B21, version 4.0, Download Functions, Association of Radio Industries and Businesses, Feb. 6, 2003, P. 120 and P. 178 (Non-Patent Reference 1), in digital television broadcasting, a scheme is operated in which radio waves transmitted from a broadcast station are used to send and receive update data for an update of software in a receiver.

In this operation, from the broadcast station, common data including the logotypes and genre codes of broadcasting companies and update data for software are transmitted as download data. Then, before download data (for example, update data for software) is transmitted, a software download trigger information table (SDTT) is transmitted as it is periodically multiplexed (superimposed) on broadcast waves, which notifies a receiver that update data for software is to be downloaded. The SDTT is stored in a nonvolatile memory and monitored, whereby the receiver selectively downloads (receives) update data for software owned by the receiver, and can update its software by the update data (see JP-A-2002-112 (Patent Reference 1)).

In the SDTT, such identifications (IDs) are described that are defined in Non-Patent Reference 1, including a table ID which identifies that the data is an SDTT, a maker ID which is an ID to identify a maker of a receiver, and a model ID which identifies a model of the receiver. The receiver monitors the SDTT by filtering the SDTT by hardware or software using these IDs as parameters in a multiplexer built therein.

A process in which a classical receiver like this obtains update data for software will be described more specifically with reference to a flow chart shown in FIG. 1.

When the receiver receives broadcast waves, at Step S1, it uses a multiplexer to filter section data multiplexed with the received broadcast waves. For example, the section data includes information about an SDTT, update data for software, an EPG (Electronic Program Guide), etc.

More specifically, the multiplexer filters section data by hardware or software using the table ID, the maker ID, and the model ID defined in Non-Patent Reference 1 as parameters, and then it extracts the table ID, the maker ID, and the model ID.

The receiver confirms that the section data is the SDTT based on the table ID as well as it determines at Step S2 whether the maker ID and the model ID described in the SDTT are matched with a maker ID and a model ID owned by the receiver. At Step S2, when it is determined that the maker ID and the model ID described in the SDTT are not matched with the maker ID and the model ID of the receiver, it is considered that the SDTT is not associated with the receiver, the SDTT is discarded, and the process returns to Step S1 to repeat process steps after that.

At Step S2, when it is determined that the maker ID and the model ID described in the SDTT are matched with the maker ID and the model ID of the receiver, the process goes to Step S3. The receiver acquires the SDTT, and temporarily decompresses it over a volatile memory.

The receiver acquires version information about update data (for software) described in the SDTT, and compares it with the version of software owned by the receiver. At Step S4, it determines whether the version described in the SDTT is a necessary version. When the version described in the SDTT is the same version of software in the receiver or a smaller numbered (older) version, it is considered that the version described in the SDTT is not a necessary version, the SDTT is discarded, and the process returns to Step S1 to repeat process steps after that.

When the version described in the SDTT is a greater numbered (newer) version than the version of software in the receiver, it is considered that the version described in the SDTT is the necessary version, and the process goes to Step S5.

At Step S5, the receiver analyzes data of the SDTT (that is, it confirms other information in the SDTT). Here, the other information is information defined in Non-Patent Reference 1, including information about a network over which download and services are conducted, the size of modules that configure update data, the download start time for update data, etc.

At Step S6, the receiver prepares download for update data. More specifically, the receiver conducts clock operation by a clock built therein, and waits by the download start time for update data described in the SDTT.

Then, when the receiver determines that it is the download start time for update data, at Step S7, it downloads (acquires) update data. More specifically, the receiver receives a broadcast signal, selects a service for download, and acquires update data from the broadcast signal for a predetermined service. Accordingly, in the receiver, downloaded update data updates software.

As described above, in the download scheme of software update for the receiver in the digital broadcasting system before, the receiver selects and acquires an SDTT having the maker ID and the model ID that are matched with the IDs owned by the receiver among a plurality of SDTTs multiplexed with broadcast waves, and starts to prepare download for necessary update data based on information about the version and the download service described in the SDTT.

More specifically, in order to update software in the receiver, it is necessary that unique receiver IDs are used for each of receivers having different types of software among receivers available in the market and then SDTTs and contents are transmitted.

However, under present circumstances, the SDTT has only eight bits for the area in which the model ID can be described, the ID identifies a receiver and is defined in Non-Patent Reference 1. Thus, when the number of receivers available in the market is growing, the risk can be thought that IDs which should be unique are used up. In this case, even though receiver makers fabricate new models of receivers, they cannot use the download scheme for update of software in new model receivers.

The invention has been made in view of the circumstances. It is desirable to prevent in advance the risk that IDs that identify models of a receiving apparatus will be used up.

SUMMARY OF THE INVENTION

An information processing system according to a first facet of the invention includes a receiving apparatus which receives a broadcast signal; and a data generating unit which creates notice information relating to download for update data multiplexed with the broadcast signal for transmission and that updates software in the receiving apparatus, the data generating unit including means for describing information which describes a prescribed model ID defined by a predetermined standard in order to uniquely identify a model of the receiving apparatus in a prescribed area in the notice information defined by the predetermined standard and which describes an extended model ID used in combination with the prescribed model ID to uniquely identify a larger number of models of the receiving apparatus than the number of the prescribed model IDs in a predetermined area in the notice information; and means for generating the notice information in which the prescribed model ID and the extended model ID are described by the means for describing information, and the receiving apparatus including means for determining a prescribed ID which determines whether the prescribed model ID in the notice information multiplexed with the broadcast signal matches a prescribed model ID owned by the receiving apparatus; means for determining an extended ID which determines whether the extended model ID in the notice information matches the owned extended model ID when it is determined that the prescribed model ID in the notice information matches the owned prescribed model ID; and means for acquiring update data from the broadcast signal based on the notice information when it is determined that the extended model ID in the notice information matches the owned extended model ID.

In the system, the receiving apparatus may further include means for discarding information which discards the notice information when it is determined that the extended model ID in the notice information does not match the owned extended model ID.

In the system, the means for describing information may describe the extended model ID in a predetermined area which is arranged behind more than the prescribed area in which the prescribed model ID is described and which is not defined or not used by the predetermined standard in the notice information.

In the system, the predetermined area in which the extended model ID is described may be a private data area (Private_data_byte).

In the system, the receiving apparatus may further include means for updating software which uses the update data acquired by the means for acquiring update data to update owned software.

An information processing method according to a first facet of the invention is an information processing method of an information processing system including a receiving apparatus which receives a broadcast signal, and a data generating unit which creates notice information relating to download for update data multiplexed with the broadcast signal for transmission and that updates software in the receiving apparatus, the information processing method including, in the data generating unit, describing information to describe a prescribed model ID defined by a predetermined standard in order to uniquely identify a model of the receiving apparatus in a prescribed area in the notice information defined by the predetermined standard and to describe an extended model ID used in combination with the prescribed model ID to uniquely identify a larger number of models of the receiving apparatus than the number of the prescribed model IDs in a predetermined area in the notice information; and generating the notice information in which the prescribed model ID and the extended model ID are described by the process of describing information, and in the receiving apparatus, determining a prescribed ID to determine whether the prescribed model ID in the notice information multiplexed with the broadcast signal matches a prescribed model ID owned by the receiving apparatus; determining an extended ID to determine whether the extended model ID in the notice information matches the owned extended model ID when it is determined that the prescribed model ID in the notice information matches the owned prescribed model ID; and acquiring update data from the broadcast signal based on the notice information when it is determined that the extended model ID in the notice information matches the owned extended model ID.

A receiving apparatus according to a second facet of the invention is a receiving apparatus which receives notice information relating to download for update data created by a data generating unit and multiplexed with a broadcast signal and that updates software, the receiving apparatus including means for determining a prescribed ID which determines whether a prescribed model ID in the notice information multiplexed with the broadcast signal matches an owned prescribed model ID, wherein the prescribed model ID defined by a predetermined standard in order to uniquely identify a model of the receiving apparatus is described in a prescribed area in the notice information defined by the predetermined standard, and an extended model ID used in combination with the prescribed model ID to uniquely identify a larger number of models of the receiving apparatus than the number of the prescribed model IDs is described and created in a predetermined area in the notice information; means for determining an extended ID which determines whether the extended model ID in the notice information matches the owned extended model ID when it is determined that the prescribed model ID in the notice information matches the owned prescribed model ID; and means for acquiring update data from the broadcast signal based on the notice information when it is determined that the extended model ID in the notice information matches the owned extended model ID.

The receiving apparatus may further include means for discarding information which discards the notice information when it is determined that the extended model ID in the notice information does not match the owned extended model ID.

In the receiving apparatus, the extended model ID may be described in a predetermined area which is arranged behind more than the prescribed area in which the prescribed model ID is described and which is not defined or not used by the predetermined standard in the notice information.

In the receiving apparatus, the predetermined area in which the extended model ID is described may be a private data area (Private_data_byte).

The receiving apparatus may further include means for updating software which uses the acquired update data to update owned software.

A receiving method according to a second facet of the invention is a receiving method of a receiving apparatus which receives notice information relating to download for update data created by a data generating unit and multiplexed with a broadcast signal and that updates software, the method including determining a prescribed ID to determine whether a prescribed model ID in the notice information multiplexed with the broadcast signal matches an owned prescribed model ID, wherein the prescribed model ID defined by a predetermined standard in order to uniquely identify a model of the receiving apparatus is described in a prescribed area in the notice information defined by the predetermined standard, and an extended model ID used in combination with the prescribed model ID to uniquely identify a larger number of models of the receiving apparatus than the number of the prescribed model IDs is described and created in a predetermined area in the notice information; determining an extended ID to determine whether the extended model ID in the notice information matches the owned extended model ID when it is determined that the prescribed model ID in the notice information matches the owned prescribed model ID; and acquiring update data from the broadcast signal based on the notice information when it is determined that the extended model ID in the notice information matches the owned extended model ID.

A program according to a second facet of the invention is a program of a receiving apparatus which receives notice information relating to download for update data created by a data generating unit and multiplexed with a broadcast signal and that updates software, the program including determining a prescribed ID to determine whether a prescribed model ID in the notice information multiplexed with the broadcast signal matches with an owned prescribed model ID, wherein the prescribed model ID defined by a predetermined standard in order to uniquely identify a model of the receiving apparatus is described in a prescribed area in the notice information defined by the predetermined standard, and an extended model ID used in combination with the prescribed model ID to uniquely identify a larger number of models of the receiving apparatus than the number of the prescribed model IDs is described and created in a predetermined area in the notice information; determining an extended ID to determine whether the extended model ID in the notice information matches the owned extended model ID when it is determined that the prescribed model ID in the notice information matches the owned prescribed model ID; and acquiring update data from the broadcast signal based on the notice information when it is determined that the extended model ID in the notice information matches the owned extended model ID.

A data generating unit according to a third facet of the invention is a data generating unit which creates notice information relating to download for update data multiplexed with a broadcast signal for transmission and that updates software in a receiving apparatus which receives a broadcast signal, the data generating unit including means for describing information which describes a prescribed model ID defined by a predetermined standard in order to uniquely identify a model of the receiving apparatus in a prescribed area in the notice information defined by the predetermined standard and which describes an extended model ID used in combination with the prescribed model ID to uniquely identify a larger number of models of the receiving apparatus than the number of the prescribed model IDs in a predetermined area in the notice information; and means for generating the notice information in which the prescribed model ID and the extended model ID are described by the means for describing information.

In the data generating unit, the means for describing information may describe the extended model ID in a predetermined area which is arranged behind more than the prescribed area in which the prescribed model ID is described and which is not defined or not used by the predetermined standard in the notice information.

In the data generating unit, the predetermined area in which the extended model ID is described may be a private data area (Private_data_byte).

A data generating method according to a third facet of the invention is a data generating method of a data generating unit which creates notice information relating to download for update data multiplexed with a broadcast signal for transmission and that updates software in a receiving apparatus which receives a broadcast signal, the data generating method including describing information to describe a prescribed model ID defined by a predetermined standard in order to uniquely identify a model of the receiving apparatus in a prescribed area in the notice information defined by the predetermined standard and to describe an extended model ID used in combination with the prescribed model ID to uniquely identify a larger number of models of the receiving apparatus than the number of the prescribed model IDs in a predetermined area in the notice information; and generating the notice information in which the prescribed model ID and the extended model ID are described by the process of describing information.

A program according to a third facet of the invention is a program which allows a computer to execute a process of generating notice information relating to download for update data multiplexed with a broadcast signal for transmission and that updates software in a receiving apparatus which receives a broadcast signal, the program including describing information to describe a prescribed model ID defined by a predetermined standard in order to uniquely identify a model of the receiving apparatus in a prescribed area in the notice information defined by the predetermined standard and to describe an extended model ID used in combination with the prescribed model ID to uniquely identify a larger number of models of the receiving apparatus than the number of the prescribed model IDs in a predetermined area in the notice information; and generating the notice information in which the prescribed model ID and the extended model ID are described by the process of describing information.

In an embodiment of the invention, by the data generating unit which creates notice information relating to download for update data that updates software in the receiving apparatus, a prescribed model ID defined by a predetermined standard in order to uniquely identify a model of the receiving apparatus which receives a broadcast signal is described in a prescribed area in the notice information defined by the predetermined standard as well as an extended model ID used in combination with the prescribed model ID to uniquely identify a larger number of models of the receiving apparatus than the number of the prescribed model IDs is described in a predetermined area in the notice information, and then the notice information is generated in which the prescribed model ID and the extended model ID are described. Then, by the receiving apparatus, it is determined whether the prescribed model ID in the notice information multiplexed with the broadcast signal matches a prescribed model ID owned by the receiving apparatus, and it is determined whether the extended model ID in the notice information matches the owned extended model ID when it is determined that the prescribed model ID in the notice information matches the owned prescribed model ID. In addition, the update data is acquired from the broadcast signal based on the notice information when it is determined that the extended model ID in the notice information matches the owned extended model ID.

In another embodiment of the invention, it is determined whether a prescribed model ID in the notice information multiplexed with the broadcast signal matches an owned prescribed model ID, wherein the prescribed model ID defined by a predetermined standard in order to uniquely identify a model of the receiving apparatus is described in a prescribed area defined by the predetermined standard, and an extended model ID used in combination with the prescribed model ID to uniquely identify a larger number of models of the receiving apparatus than the number of the prescribed model IDs is described and created in a predetermined area, and it is determined whether the extended model ID in the notice information matches the owned extended model ID when it is determined that the prescribed model ID in the notice information matches the owned prescribed model ID. Then, the update data is acquired from the broadcast signal based on the notice information when it is determined that the extended model ID in the notice information matches the owned extended model ID.

In still another embodiment of the invention, a prescribed model ID defined by a predetermined standard in order to uniquely identify a model of the receiving apparatus is described in a prescribed area in the notice information defined by the predetermined standard and an extended model ID used in combination with the prescribed model ID to uniquely identify a larger number of models of the receiving apparatus than the number of the prescribed model IDs is described in a predetermined area in the notice information. Then, the notice information is generated in which the prescribed model ID and the extended model ID are described.

According to the first facet of the invention, the using up of IDs that identify models of a receiving apparatus can be prevented in advance. Therefore, even though the models of a receiving apparatus are increased, the software in the receiving apparatus can be updated easily.

According to the second facet of the invention, even though the models of a receiving apparatus are increased, update data for software can be acquired easily.

According to the third facet of the invention, the using up of IDs that identify models of a receiving apparatus can be suppressed in advance.

BRIEF DESCRIPTION OF THE DRAWINGS

FIG. 8 shows a diagram depicting an exemplary configuration of extended model ID data;

FIG. 9 shows a diagram depicting an exemplary configuration of a detailed SDTT;

FIG. 10 shows a diagram depicting an exemplary configuration of a detailed SDTT;

FIG. 11 shows a diagram depicting the configuration of download contents descriptors;

FIG. 12 shows a diagram depicting the configuration of download contents descriptors;

DETAILED DESCRIPTION

Hereinafter, an embodiment of the invention will be described. The following is examples of the correspondence between configuration requirements for the invention and the embodiments of the detailed description of the invention. This is described for confirming that the embodiments supporting the invention are described in the detailed description of the invention. Therefore, even though there is an embodiment that is described in the detailed description of the invention but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

Figure 1:
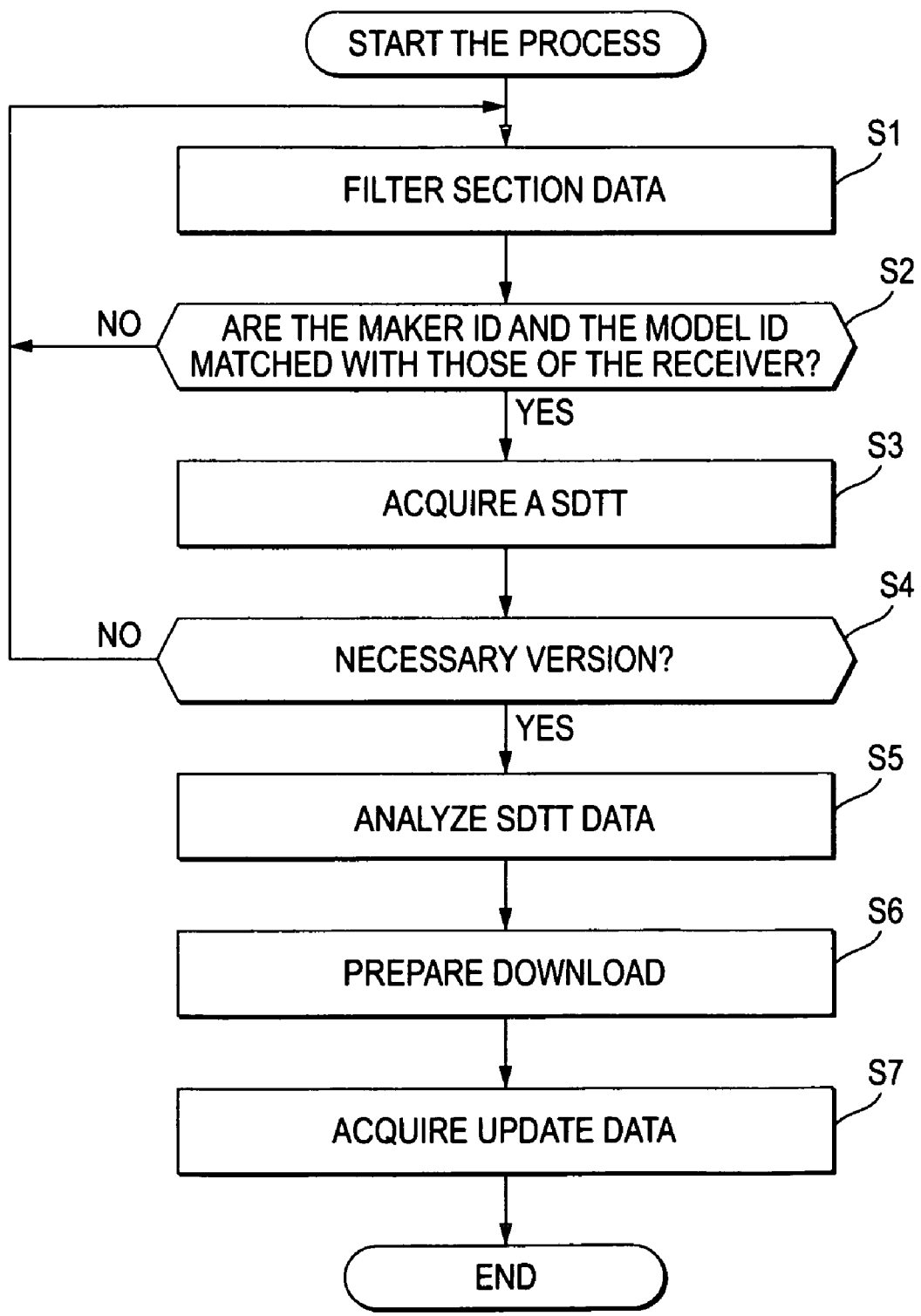
FIG. 1 shows a flow chart illustrative of an update data acquisition process done by a receiver before.
Figure 2:
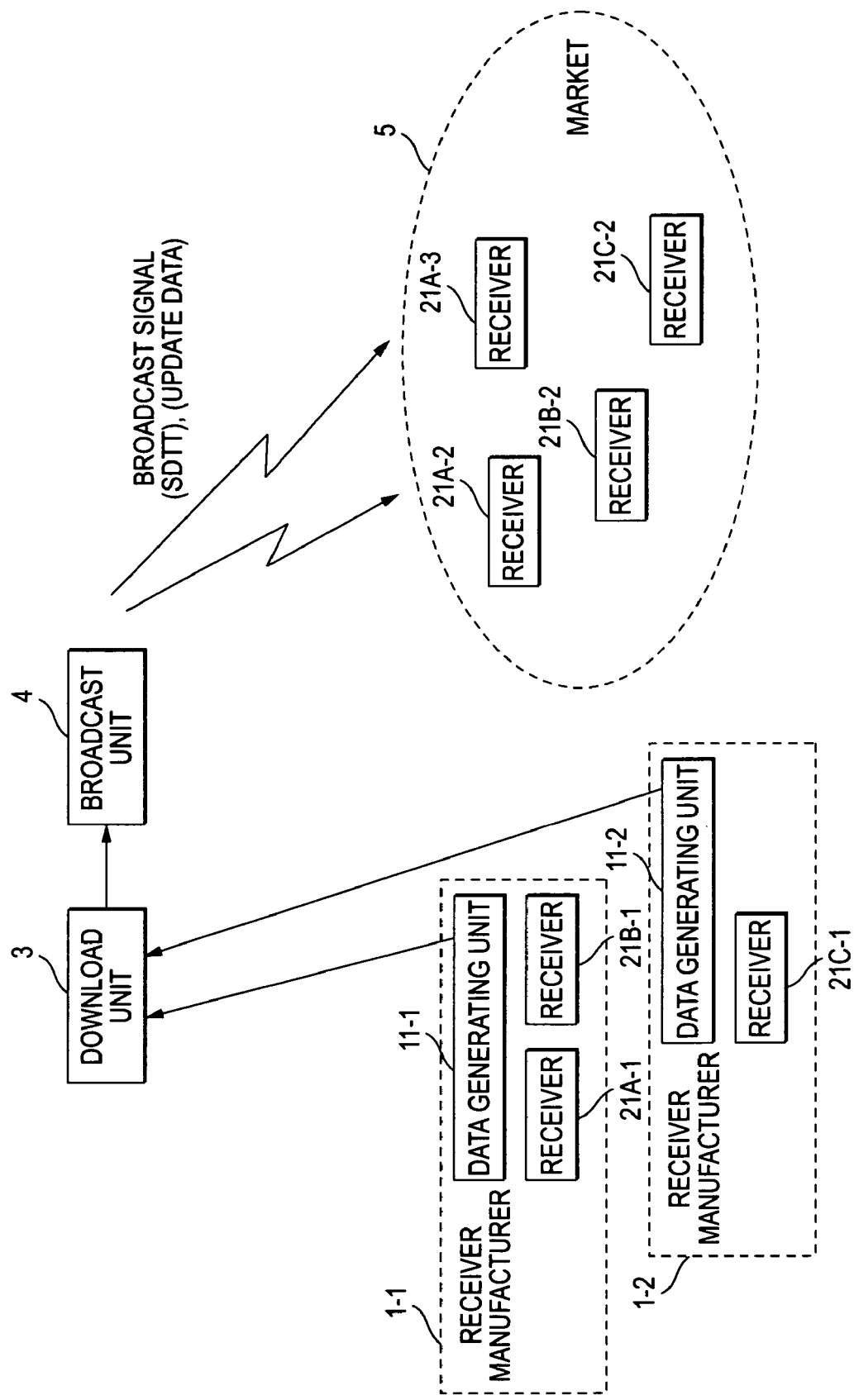
FIG. 2 shows an exemplary configuration of a digital television broadcasting system according to an embodiment of the invention.
Figure 4:
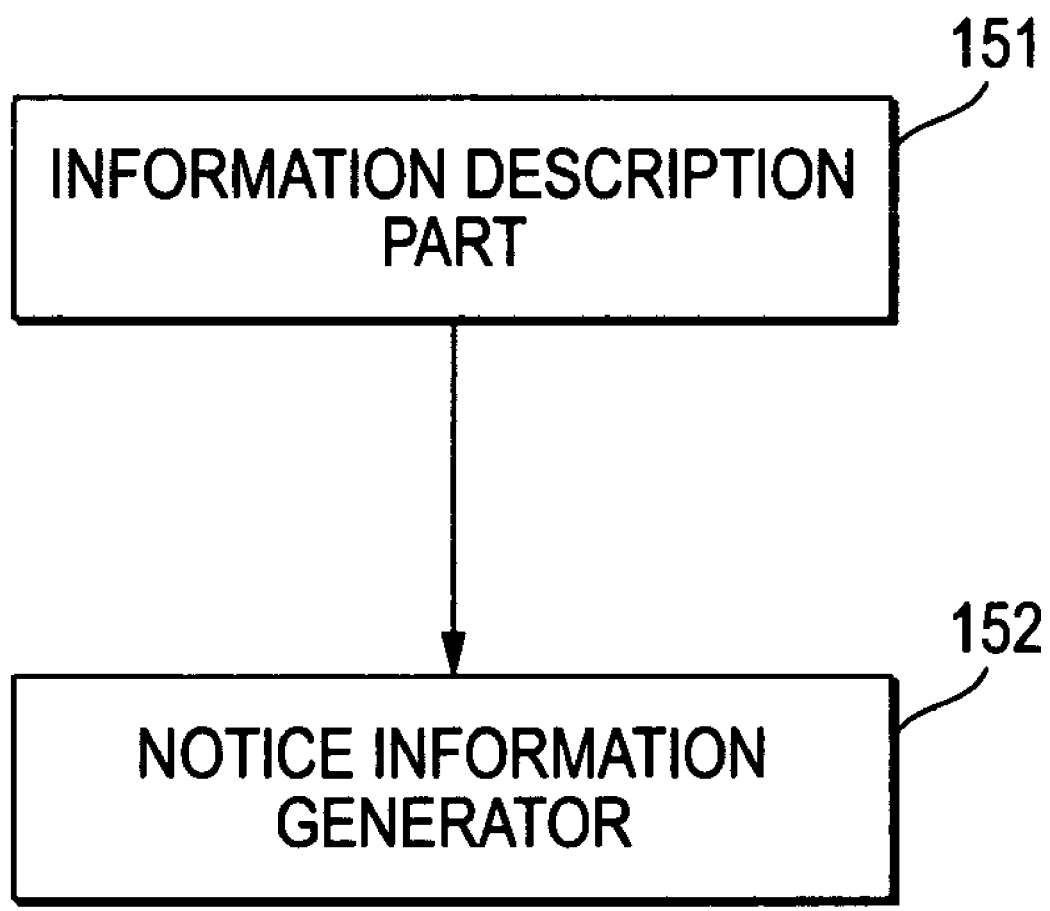
FIG. 4 shows a block diagram depicting an exemplary functionality configuration of a data generating unit shown in FIG. 3.

An information processing system according to a first facet of the invention is information processing system (for example, a digital television broadcasting system shown in FIG. 2) including: a receiving apparatus (for example, a receiver 21A-2 shown in FIG. 2) which receives a broadcast signal; and a data generating unit (for example, a data generating unit 11-1 shown in FIG. 2) which creates notice information relating to download for update data that is multiplexed with the broadcast signal for transmission and that updates software in the receiving apparatus, wherein the data generating unit includes: a device operable to describe information (for example, an information describing part 151 shown in FIG. 4) which describes a prescribed model ID (for example, model_id shown in FIG. 9) defined by a predetermined standard in order to uniquely identify a model of the receiving apparatus in a prescribed area (for example, table_id_ext shown in FIG. 9) in the notice information defined by the predetermined standard and which describes an extended model ID (for example, sub_model_id shown in FIG. 8) that is used in combination of the prescribed model ID to uniquely identify a larger number of the models of the receiving apparatus than a number of the prescribed model ID in a predetermined area (for example, private_data_byte shown in FIG. 12) of the notice information; and a device operable to generate the notice information (for example, a notice information generating part 152 shown in FIG. 4), the notice information in which the prescribed model ID and the extended model ID are described by the device operable to describe information, and the receiving apparatus includes: a device operable to determine a prescribed ID (for example, a demultiplexer 221 shown in FIG. 5) which determines whether the prescribed model ID in the notice information multiplexed with the broadcast signal is matched with a prescribed model ID owned by the receiving apparatus; a device operable to determine an extended ID (for example, an extended ID determining part 261 shown in FIG. 6) which determines whether the extended model ID in the notice information is matched with the owned extended model ID when it is determined that the prescribed model ID in the notice information is matched with the owned prescribed model ID by the device operable to determine a prescribed ID; and a device operable to acquire update data (for example, an update data acquiring part 252 shown in FIG. 6) which acquires the update data from the broadcast signal based on the notice information when it is determined that the extended model ID in the notice information is matched with the owned extended model ID by the device operable to determine an extended ID.

Figure 6:
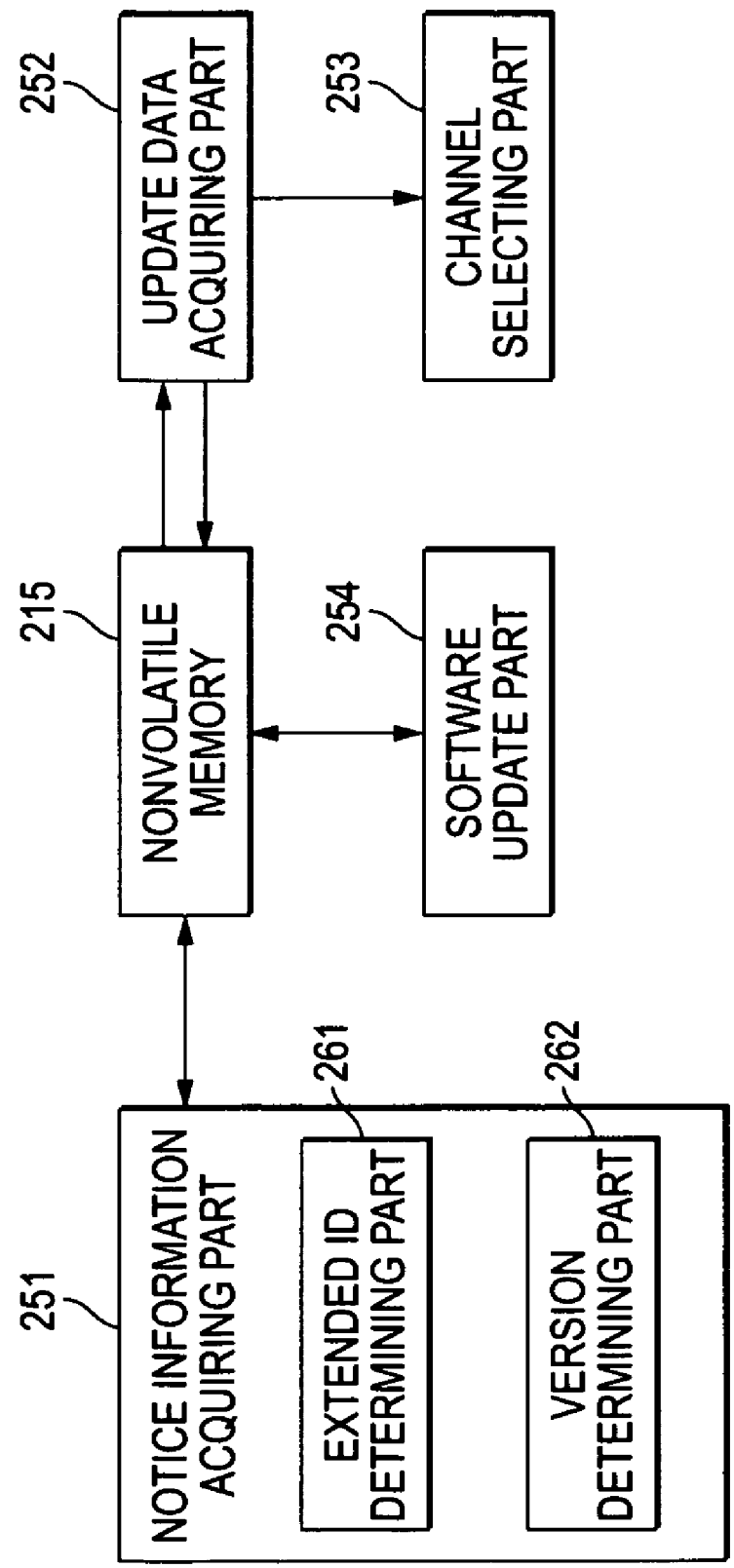
FIG. 6 shows a block diagram depicting an exemplary functionality configuration of a receiver shown in FIG. 5.

The receiving apparatus may further include a device operable to discard information (for example, the notice information acquiring part 251 shown in FIG. 6) which discards the notice information when it is determined that the extended model ID in the notice information is not matched with the owned extended model ID by the means for determining an extended ID.

The receiving apparatus may further include a device operable to update software (for example, a software update part 254 shown in FIG. 6) which uses the update data acquired by the means for acquiring update data to update owned software.

An information processing method according to a first facet of the invention is an information processing method of an information processing system including: a receiving apparatus which receives a broadcast signal; and a data generating unit which creates notice information relating to download for update data that is multiplexed with the broadcast signal for transmission and that updates software in the receiving apparatus, the information processing method including the steps of: in the data generating unit, describing information (for example, Step S11 shown in FIG. 13) to describe a prescribed model ID defined by a predetermined standard in order to uniquely identify a model of the receiving apparatus in a prescribed area in the notice information defined by the predetermined standard and to describe an extended model ID that is used in combination of the prescribed model ID to uniquely identify a larger number of the models of the receiving apparatus than a number of the prescribed model ID in a predetermined area in the notice information; and generating the notice information (for example, Step S12 shown in FIG. 13), the notice information in which the prescribed model ID and the extended model ID are described by the process of describing information, and in the receiving apparatus, determining a prescribed ID (for example, Step S42 shown in FIG. 14) to determine whether the prescribed model ID in the notice information multiplexed with the broadcast signal is matched with a prescribed model ID owned by the receiving apparatus; determining an extended ID (for example, Step S45 shown in FIG. 14) to determine whether the extended model ID in the notice information is matched with the owned extended model ID when it is determined that the prescribed model ID in the notice information is matched with the owned prescribed model ID by the process of determining a prescribed ID; and acquiring update data (for example, Step S72 shown in FIG. 15) to acquire the update data from the broadcast signal based on the notice information when it is determined that the extended model ID in the notice information is matched with the owned extended model ID by the process of determining an extended ID.

A receiving apparatus according to a second facet of the invention is a receiving apparatus (for example, the receiver 21A-2 shown in FIG. 2) which receives notice information relating to download for update data that is created by a data generating unit (for example, the data generating unit 11-1 shown in FIG. 2) and multiplexed with a broadcast signal and that updates software, the receiving apparatus including: a device operable to determine a prescribed ID (for example, the demultiplexer 221 shown in FIG. 5) which determines whether a prescribed model ID in the notice information multiplexed with the broadcast signal is matched with an owned prescribed model ID, wherein the prescribed model ID (for example, model_id shown in FIG. 9) defined by a predetermined standard in order to uniquely identify a model of the receiving apparatus is described in a prescribed area defined by the predetermined standard, and an extended model ID (for example, sub_model_id shown in FIG. 8) that is used in combination of the prescribed model ID to uniquely identify a larger number of the models of the receiving apparatus than a number of the prescribed model ID is described and created in a predetermined area; a device operable to determine an extended ID (for example, the extended ID determining part 261 shown in FIG. 6) which determines whether the extended model ID in the notice information is matched with the owned extended model ID when it is determined that the prescribed model ID in the notice information is matched with the owned prescribed model ID by the device operable to determine a prescribed ID; and a device operable to acquire update data (for example, the update data acquiring part 252 shown in FIG. 6) which acquires the update data from the broadcast signal based on the notice information when it is determined that the extended model ID in the notice information is matched with the owned extended model ID by the device operable to determine an extended ID.

The receiving apparatus may further include a device operable to discard information (for example, the notice information acquiring part 251 shown in FIG. 6) which discards the notice information when it is determined that the extended model ID in the notice information is not matched with the owned extended model ID by the device operable to determine an extended ID.

The receiving apparatus may further include a device operable to update software (for example, a software update part 254 shown in FIG. 6) which uses the update data acquired by the device operable to acquire update data to update owned software.

A receiving method according to a second facet of the invention or a program is a receiving method or a program of a receiving apparatus which receives notice information relating to download for update data that is created by a data generating unit and multiplexed with a broadcast signal and that updates software, the method apparatus including the steps of: determining a prescribed ID (for example, Step S42 shown in FIG. 14) to determine whether a prescribed model ID in the notice information multiplexed with the broadcast signal is matched with an owned prescribed model ID, wherein the prescribed model ID defined by a predetermined standard in order to uniquely identify a model of the receiving apparatus is described in a prescribed area defined by the predetermined standard, and an extended model ID that is used in combination of the prescribed model ID to uniquely identify a larger number of the models of the receiving apparatus than a number of the prescribed model ID is described and created in a predetermined area; determining an extended ID (for example, Step S45 shown in FIG. 14) to determine whether the extended model ID in the notice information is matched with the owned extended model ID when it is determined that the prescribed model ID in the notice information is matched with the owned prescribed model ID by the process of determining a prescribed ID; and acquiring update data (for example, Step S72 shown in FIG. 15) to acquire the update data from the broadcast signal based on the notice information when it is determined that the extended model ID in the notice information is matched with the owned extended model ID by the process of determining an extended ID.

A data generating unit according to a third facet of the invention is a data generating unit (for example, the data generating unit 11-1 shown in FIG. 2) which creates notice information relating to download for update data that is multiplexed with a broadcast signal for transmission and that updates software in a receiving apparatus (for example, a receiver 21A-2 shown in FIG. 2) which receives a broadcast signal, the data generating unit including: a device operable to describe information (for example, an information describing part 151 shown in FIG. 4) which describes a prescribed model ID defined by a predetermined standard in order to uniquely identify a model of the receiving apparatus in a prescribed area of the notice information defined by the predetermined standard and which describes an extended model ID that is used in combination of the prescribed model ID to uniquely identify a larger number of the models of the receiving apparatus than a number of the prescribed model ID in a predetermined area of the notice information; and a device operable to generate the notice information (for example, a notice information generating part 152 shown in FIG. 4), the notice information in which the prescribed model ID and the extended model ID are described by the device operable to describe information.

A data generating method according to a third facet of the invention or a program is a data generating method or a program of a data generating unit which creates notice information relating to download for update data that is multiplexed with a broadcast signal for transmission and that updates software in a receiving apparatus which receives a broadcast signal, the data generating method including the steps of: describing information (for example, Step S11 shown in FIG. 13) to describe a prescribed model ID defined by a predetermined standard in order to uniquely identify a model of the receiving apparatus in a prescribed area in the notice information defined by the predetermined standard and to describe an extended model ID that is used in combination of the prescribed model ID to uniquely identify a larger number of the models of the receiving apparatus than a number of the prescribed model ID in a predetermined area in the notice information; and generating the notice information (for example, Step S12 shown in FIG. 13), the notice information in which the prescribed model ID and the extended model ID are described by the process of describing information.

Hereinafter, an embodiment of the invention will be described with reference to the drawings.

FIG. 2 shows an exemplary configuration of a digital television broadcasting (hereinafter, also called digital broadcasting) system to which an embodiment of the invention is adapted. In addition, in the example shown in FIG. 2, terrestrial digital broadcasting is used for description.

In the digital broadcasting system, from a broadcast unit 4, common data including the logotypes and the genre codes of broadcasting companies and update data for software for every receiver are transmitted as download data, the data is multiplexed with broadcast signals.

A receiver manufacturer (maker) 1-1 that produces a receiver 21A-1 of type A and a receiver 21B-1 of type B has a data generating unit 11-1. The data generating unit 11-1 creates update data for terrestrial digital broadcasting software of models to be updated and a software download trigger information table (SDTT) for every model, and provides (transmits) them to a download unit 3 owned by a download provider, the SDTT notifies receivers in the market that update data is to be downloaded.

At this time, the data generating unit 11-1 creates the SDTT in such a way that a maker ID (maker_id) which is an ID (make_id) that identifies the receiver manufacturer 1-1, as well as a model ID (model_id) and an extended model ID (sub_model_id) which are established depending on models for update are described in the corresponding areas in the receiver manufacturer 1-1.

Here, the model ID is the ID which is defined as an identification that identifies a model of a receiver in Non-Patent Reference 1. The extended model ID is provided by the receiver manufacturer 1-1 in order to uniquely identify a greater number of models of receivers than the number of model IDs as it is combined with the model ID. The combination of the model ID with the extended model ID is uniquely established for every model beforehand in the receiver manufacturer 1-1.

More specifically, in the digital broadcasting system shown in FIG. 2, a receiver is not uniquely identified only by the model ID. The model ID and the extended model ID are combined with each other to uniquely identify a receiver. In other words, some receivers produced by the receiver manufacturer (the maker) 1-1 may have the same model ID, or the same extended model ID.

In addition, the receiver 21A-1 and the receiver 21B-1 produced in the receiver manufacturer 1-1 have a maker ID as well as a model ID and an extended model ID stored therein in advance, and then they are shipped on the market.

A receiver manufacturer 1-2 that produces a receiver 21C-1 of type C has a data generating unit 11-2. As similar to the data generating unit 11-1, the data generating unit 11-2 creates update data for terrestrial digital broadcasting software of models to be updated and a software download trigger information table (SDTT) for every model, and provides (transmits) them to a download unit 3 owned by a download provider.

At this time, as similar to the data generating unit 11-1, the data generating unit 11-2 creates the SDTT in such a way that a maker ID which is an ID that identifies the receiver manufacturer 1-2, as well as a model ID and an extended model ID which are established depending on models for update are described in the corresponding areas in the receiver manufacturer 11-2.

In addition, also in the receiver manufacturer 1-2, the produced receiver 21C-1 has a maker ID as well as a model ID and an extended model ID stored therein in advance, and then it is shipped on the market.

Hereinafter, when it is unnecessary to distinguish between the receiver manufacturers 1-1 and 1-2 and between the data generating units 11-1 and 11-2, the former ones are called a receiver manufacturer 1 and the latter ones are called a data generating unit 11.

The download unit 3 collects and schedules update data provided by the receiver manufacturers 1-1 and 1-2, and multiplexes the update data and common data including the logotypes and the genre codes of broadcasting companies as download data with broadcast signals through the broadcast unit 4 for broadcasting. In addition, at this time, download data is multiplexed with the broadcast signals as a data carousel in DSM-CC data carousel mode, and it is broadcast.

In addition, the download unit 3 describes and completes necessary information (for example, download information such as the download time for update data based on the schedule of update data download and the service (channel) to perform download) based on update data on the SDTT provided by the receiver manufacturers 1-1 and 1-2 before transmitting download data, and multiplexes the completed SDTT with the broadcast signals through the broadcast unit 4 for broadcasting.

In the market 5, there are various models of digital broadcasting receivers such as receivers 21A-2 and 21A-3 of type A, a receiver 21B-2 of type B, and a receiver 21C-2 of type C. Hereinafter, when it is unnecessary to distinguish among the receivers 21A-1 to 21A-3, the receivers 21B-1 and 21B-2, and the receivers 21C-1 and 21C-2, they are simply called a receiver 21A, 21B, and 21C, or collectively called a receiver 21.

The receivers 21 in the market 5 receive the broadcast signals from the broadcast unit 4, and acquire the SDTT. As described above, the receivers 21 have the maker ID as well as the model ID and the extended model ID stored therein beforehand by the corresponding receiver manufacturers 1.

The receiver 21 first references to the maker ID and the model ID described (listed) in the SDTT, it determines whether they are matched with the maker ID and the model ID owned by the receiver 21 (that is, those stored in the receiver 21). When the maker ID and the model ID in the SDTT are matched with the owned maker ID and the model ID, it determines whether the extended model ID described in the SDTT is matched with the owned extended model ID.

When it is determined that the extended model ID described in the SDTT is matched with the owned extended model ID, the receiver 21 prepares download for update data based on the SDTT, in the case in which the version of update data described in the SDTT is newer than the version of software stored therein. Then, when it is the download start time for update data described in the SDTT, the receiver 21 receives the broadcast signals having download data multiplexed, downloads (acquires) update data, and uses the downloaded update data to update its software.

As described above, in the digital broadcasting system shown in FIG. 2, the prescribed model ID is uniquely identified as well as a model of a receiver is uniquely identified by combining the model ID with the extended model ID. Accordingly, a larger number of receivers can be identified than in the case in which only the prescribed model ID is used to identify a model of a receiver.

In addition, in the example shown in FIG. 2, two receiver manufacturers 1, a single download unit 3 and a single broadcast unit 4 are shown, but in reality, there are a given number of a plurality of receiver manufacturers 1, a plurality of download units 3 and a plurality of broadcast units 4. In addition, in the market 5, two receivers 21A of type A, a single receiver 21B of type B, and a single receiver 21C of type C are shown, but there is a given number of a plurality of receivers 21. The number of models of receivers is not limited to three models, and there is a plurality of models.

Figure 3:
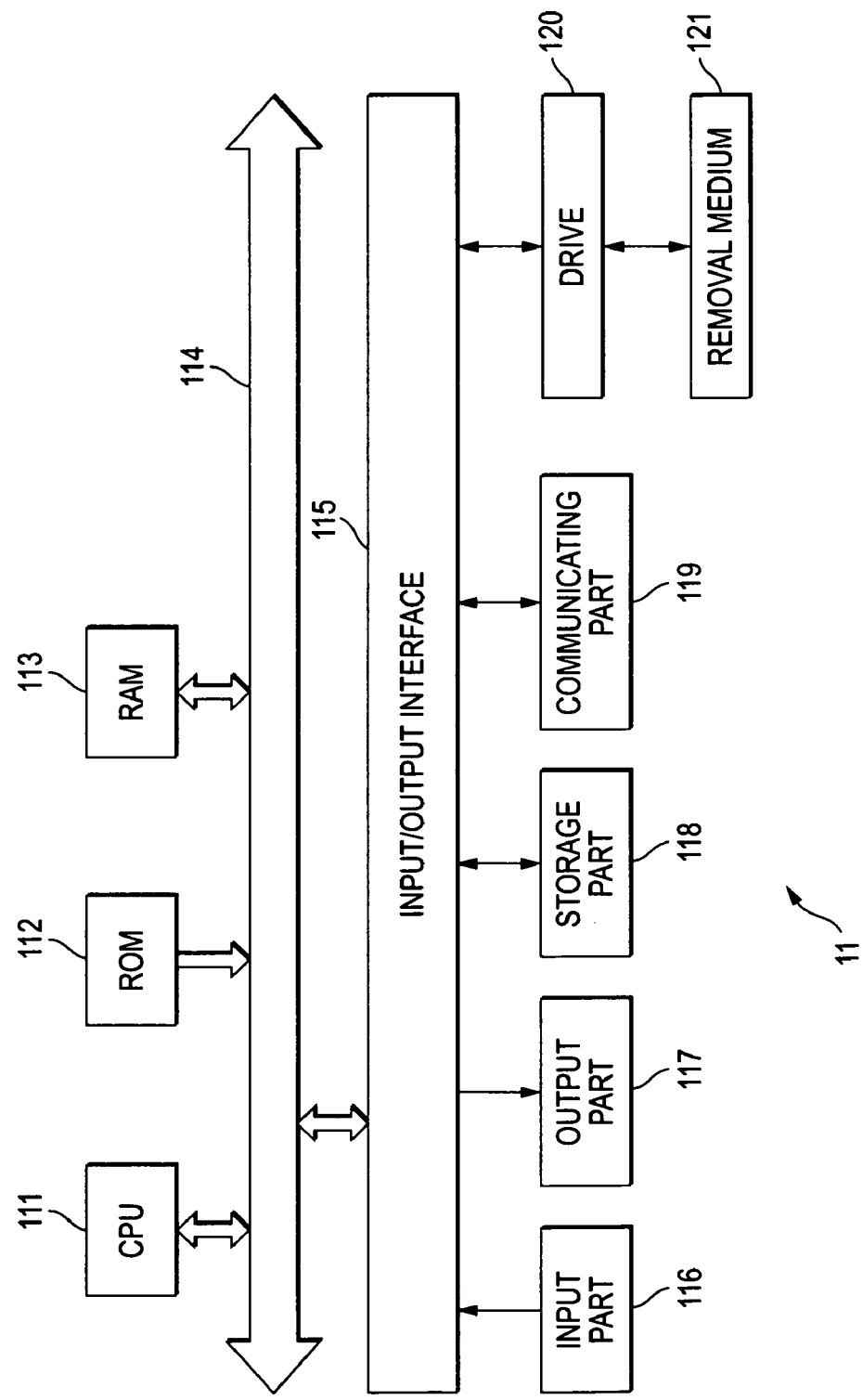
FIG. 3 shows a block diagram depicting an exemplary configuration of a data generating unit shown in FIG. 2.

FIG. 3 shows an exemplary configuration of the data generating unit 11. In the example shown in FIG. 3, a CPU (Central Processing Unit) 111 executes various processes in accordance with programs stored in a ROM (Read Only Memory) 112, or programs loaded from a storage part 118 to a RAM (Random Access Memory) 113. In the RAM 113, data necessary to execute various processes by the CPU 111 is properly stored as well.

The CPU 111, the ROM 112, and the RAM 113 are connected to one another through a bus 114. To the bus 114, an input/output interface 115 is also connected.

To the input/output interface 115, an input part 116 formed of a keyboard, a mouse, a microphone and other devices, and an output part 117 formed of a display, a speaker and other devices are connected. The CPU 111 executes various processes in response to an instruction inputted from the input part 116. Then, the CPU 111 outputs the result of the process to the output part 117.

The storage part 118 connected to the input/output interface 115 is formed of a hard disk, for example, and stores programs executed by the CPU 111 and various items of data. A communicating part 119 communicates with external devices over a network such as the Internet and a local area network. In addition, a program may be acquired through the communicating part 119 and stored in the storage part 118.

A drive 120 connected to the input/output interface 115 drives a removal medium 121 such as a magnetic disc, an optical disc, a magneto-optical disc, or a semiconductor memory when it is mounted, and acquires programs and data recorded thereon. The acquired program and data are transferred to the storage part 118 and stored therein as necessary.

In addition, not shown in the drawing, the download unit 3 and the broadcast unit 4 are basically similarly configured as the data generating unit 11 shown in FIG. 3. Therefore, in the discussion below, the configuration of the data generating unit 11 shown in FIG. 3 is referenced as the configuration of the download unit 3 or the broadcast unit 4 as necessary.

FIG. 4 shows an exemplary functionality configuration of the data generating unit 11 which conducts an SDTT creation process. Functionality blocks shown in FIG. 4 are implemented by executing a predetermined control program by the CPU 111 shown in FIG. 3.

The functionality blocks shown in FIG. 4 are configured of an information description part 151 and a notice information generating part 152.

The information description part 151 describes information (the maker ID, and the model ID, the extended model ID and the other data established beforehand by the receiver manufacturer 1) to be described in the SDTT on the receiver manufacturer 1 side inputted in response to the manipulation by the keyboard and other devices configuring the input part 116 of the receiver manufacturer 1 in the associated areas.

For example, the maker ID and the model ID are described in the defined area arranged at near the beginning of the SDTT defined by the Non-Patent Reference 1 (for example, in tableIdExtension (table_id_ext) in FIG. 9). In addition, as described later with reference to FIG. 7 in detail, the extended model ID is described in a private data area (private_data_byte) in the SDTT, for example.

To the notice information generating part 152, the information description part 151 supplies data in which information to be described in the SDTT on the receiver manufacturer 1 side is all described.

The notice information generating part 152 converts data supplied from the information description part 151 to an SDTT format, and creates an SDTT.

Figure 5:
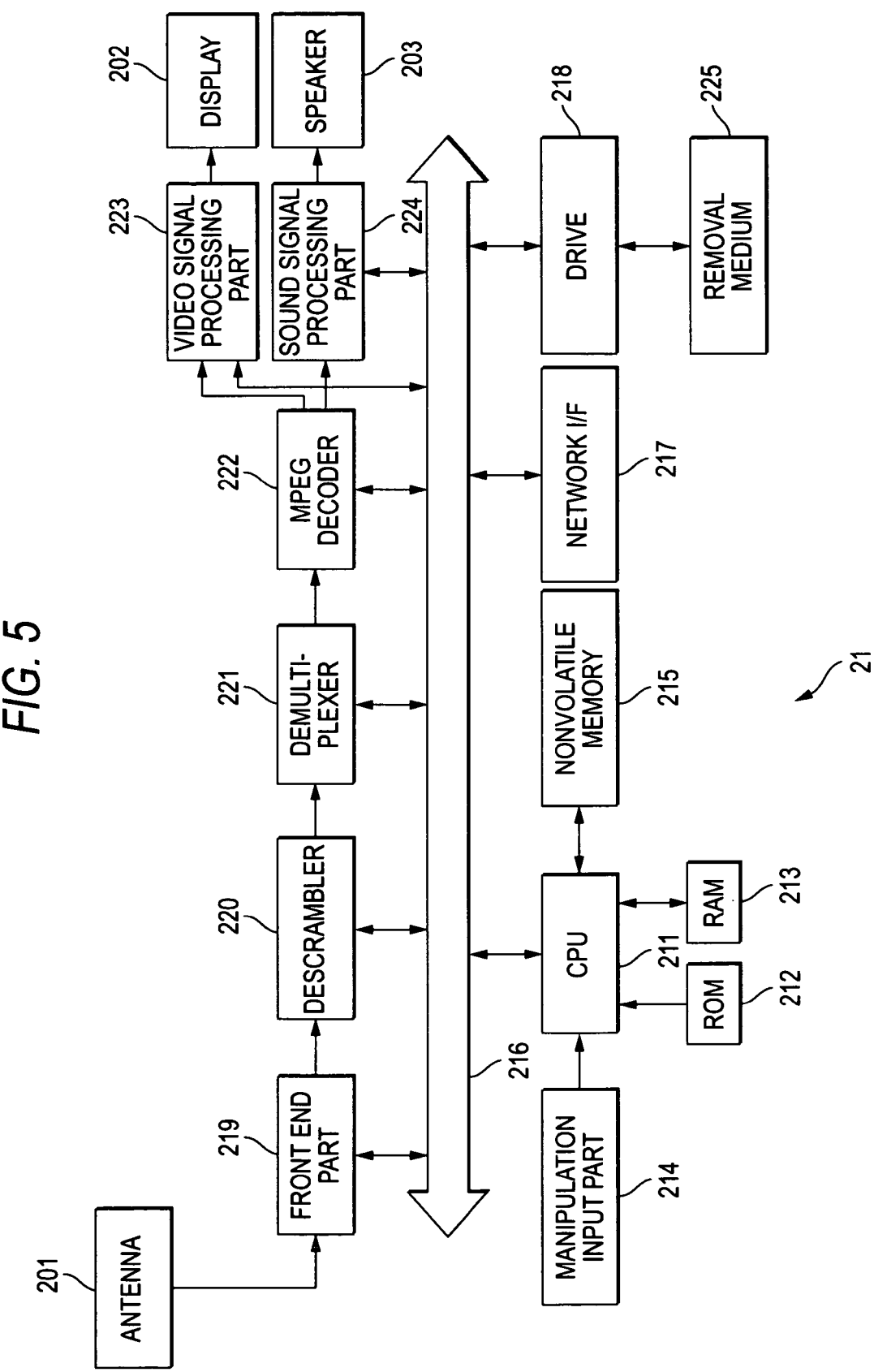
FIG. 5 shows a block diagram depicting an exemplary configuration of a receiver shown in FIG. 2.

FIG. 5 shows an exemplary configuration of the receiver 21. The receiver 21 receives the broadcast signal from the broadcast unit 4 through an antenna 201, selects a channel, and outputs the video from a display 202 as well as outputs the sound from the speaker 203.

In the example shown in FIG. 5, to a CPU (Central Processing Unit) 211, a ROM (Read Only Memory) 212, a RAM (Random Access Memory) 213, a manipulation input part 214, and a nonvolatile memory 215 are connected. The CPU 211 controls each part of the receiver 21 to execute various processes in accordance with a program stored in the ROM 212, or a program loaded in the RAM 213, or instruction signals done by a user and obtained through the manipulation input part 214. In addition, the RAM 213 properly stores therein data necessary to execute various processes by the CPU 211. The manipulation input part 214 is formed of input buttons and a dial, and outputs instruction signals done by the user to the CPU 211. The nonvolatile memory 215 stores therein the SDTT and update data for software received by the receiver 21.

To the CPU 211, a network interface (I/F) 217, a drive 218, a front end part 219, a descrambler 220, a demultiplexer 221, an MPEG (Moving Picture Experts Group) decoder 222, a video signal processing part 223, and a sound signal processing part 224 are connected through a bus 216, each part executes a predetermined process in accordance with control by the CPU 211.

The network interface 217 is configured of a modem and an IEEE 802.3 interface, which establishes a data link to a server connected to a network, not shown, and sends predetermined data by data transfer protocols such as FTP (File Transfer Protocol) and HTTP (Hyper Text Transport Protocol), as necessary. On the drive 218, a removal medium 225 is properly mounted, including a magnetic disc, an optical disc, a magneto-optical disc, or a semiconductor memory. The drive 218 is used in reading and writing data to the removal medium 225. A computer program read out of the removal medium 225 is stored and installed in the ROM 212 or the nonvolatile memory 215, as necessary.

The front end part 219 extracts and demodulates the broadcast signal corresponding to the channel selected by the user from the broadcast signal received through the antenna 201, creates a transport stream (TS), and outputs it to the descrambler 220. The descrambler 220 properly descrambles the transport stream inputted from the front end part 219, and outputs it to the demultiplexer 221.

The demultiplexer 221 isolates the multiplexed transport stream into a stream such as video or sound data or section data. The demultiplexer 221 outputs video data and sound data to the MPEG decoder 222, and outputs only necessary section data to the CPU 211. More specifically, in the demultiplexer 221, a filter can be applied by software or hardware in which a parameter is specified to the filter to output only necessary section data to the CPU 211.

The section data includes a DSM-CC section for use in data broadcasting and data download (for example, a data carousel), the SDTT (download notice information), EPG (Electronic program Guide) information, etc.

For example, since the table ID which identifies the data is an SDTT, the maker ID, and the model ID are arranged near the beginning of the SDTT, the table ID and the maker ID and the model ID with which the receiver 21 is associated are specified as parameters, whereby the demultiplexer 221 can select among SDTTs only an SDTT having the maker ID and the model ID with which the receiver 21 is associated, and outputs it to the CPU 211.

The CPU 211 decompresses each item of information of section data from the demultiplexer 221 over the RAM 213. In the section data decompressed over the RAM 213, data to be stored is converted in the format by the CPU 211 and stored in the RAM 213 and the nonvolatile memory 215.

The MPEG decoder 222 decodes video data from the demultiplexer 221, outputs it to the video signal processing part 223, as well as decodes sound data from the demultiplexer 221 and outputs it to the sound signal processing part 224.

The video signal processing part 223 adds (superimposes) data broadcasting data and other data on video data from the demultiplexer 221, converts it to signals in NTSC format, and displays video on the display 202. The sound signal processing part 224 outputs sound data inputted from the demultiplexer 221 out of the speaker 203.

Here, basic operation of the receiver 21 will be described.

The front end part 219 extracts the broadcast signal corresponding to the channel selected by a user from the broadcast signal received through the antenna 201, demodulates it to create a transport stream, and outputs it to the descrambler 220. The descrambler 220 properly descrambles the transport stream inputted from the front end part 219, and outputs it to the demultiplexer 221.

The demultiplexer 221 isolates the multiplexed transport stream from the front end part 219 into a stream of video or sound data and into section data, outputs only video data and sound data to the MPEG decoder 222, and outputs only the necessary section data to the CPU 211.

The MPEG decoder 222 decodes video data from the demultiplexer 221, outputs it to the video signal processing part 223, decodes sound data from the demultiplexer 221, and outputs it to the sound signal processing part 224.

The video signal processing part 223 adds (superimposes) data broadcasting data and other data on video data from the demultiplexer 221, converts it to signals in NTSC format, and displays video corresponding to the converted video data on the display 202. The sound signal processing part 224 outputs sounds corresponding to the sound data inputted from the demultiplexer 221 out of the speaker 203.

Accordingly, on the display 202 of the receiver 21, the video of a predetermined service is displayed, and from the speaker 203, the sounds of a predetermined service are outputted.

FIG. 6 shows an exemplary functionality configuration of the receiver 21 which updates software based on the SDTT. Functionality blocks shown in FIG. 6 are implemented by executing a predetermined control program by the CPU 211 shown in FIG. 5.

The functionality blocks shown in FIG. 6 are configured of a notice information acquiring part 251, an update data acquiring part 252, a channel selecting part 253, a software update part 254, and the nonvolatile memory 215 shown in FIG. 5.

The notice information acquiring part 251 receives the SDTT selected by the demultiplexer 221 among the items of the section data from the demultiplexer 221, temporarily decompresses it over the RAM 213, and stores the SDTT in the nonvolatile memory 215 depending on the determined result of the SDTT done by an extended ID determining part 261 and a version determining part 262 built therein.

In the nonvolatile memory 215, data is stored such as the extended model ID of the receiver 21, and current version information about software of the receiver 21.

Under the control by the notice information acquiring part 251, the extended ID determining part 261 references to the extended model ID in the nonvolatile memory 215, and determines whether the extended model ID is described in the SDTT, and whether the extended model TD described in the SDTT is matched with the extended model ID owned by the receiver 21.

When the extended ID determining part 261 determines that the extended model ID is not described in the SDTT, or determines that the extended model ID described in the SDTT is not matched with the extended model ID owned by the receiver 21, the notice information acquiring part 251 discards the SDTT decompressed over the RAM 213.

Under the control by the notice information acquiring part 251, the version determining part 262 references to the version of software information in the nonvolatile memory 215, and determines whether the version of update data described in the SDTT is the necessary version for the receiver 21. More specifically, when the version described in the SDTT is the same version as the version of software of the receiver 21 or smaller (older), the version determining part 262 determines that the version described in the SDTT is not the necessary version, whereas when the version described in the SDTT is greater (newer) than the version of software of the receiver 21, it determines that the version described in the SDTT is the necessary version.

When the version determining part 262 determines that the version described in the SDTT is not the necessary version, the notice information acquiring part 251 discards the SDTT decompressed over the RAM 213.

More specifically, the notice information acquiring part 251 stores the SDTT decompressed over the RAM 213 in the nonvolatile memory 215 when the extended ID determining part 261 determines that the extended model ID is described in the SDTT, when the extended ID determining part 261 determines that the extended model ID described in the SDTT is matched with the extended model ID owned by the receiver 21, and when the version determining part 262 determines that the version described in the SDTT is the necessary version.

When the SDTT is stored in the nonvolatile memory 215, the update data acquiring part 252 analyzes information described in the SDTT, and prepares download for update data. More specifically, the update data acquiring part 252 analyzes information described in the SDTT, whereby it confirms download information such as the download start time for update data and the service (channel) which downloads update data, decides the download start time for update data, conducts clock operation by a clock built therein, and waits until it is the download start time for update data described in the SDTT.

When the update data acquiring part 252 determines that it is the download start time for update data, it controls the channel selecting part 253 to select the service (channel) described in the SDTT, controls the demultiplexer 221 to acquire update data of the necessary version for the receiver 21 from the broadcast signal of the service selected by the channel selecting part 253, and temporarily stores the acquired update data in the nonvolatile memory 215.

Under control by the update data acquiring part 252, the channel selecting part 253 selects the service (channel) described in the SDTT at the download start time for update data described in the SDTT.

The software update part 254 uses update data stored in the nonvolatile memory 215 by the update data acquiring part 252 to update software in the receiver 21.

Figure 7:
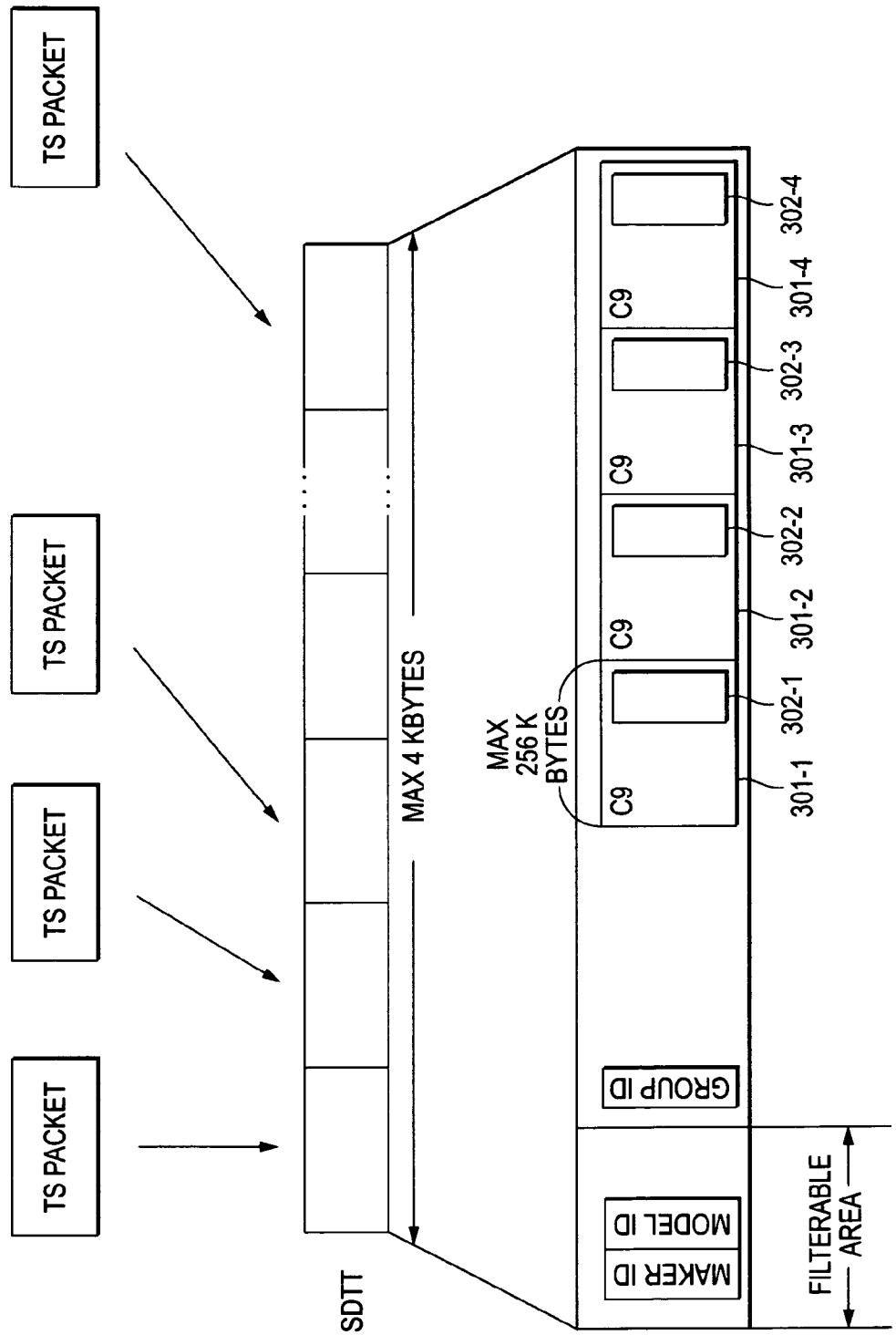
FIG. 7 shows a diagram depicting an exemplary configuration of an SDTT.

FIG. 7 shows a diagram depicting an exemplary configuration of the SDTT.

The SDTT is configured to have four Kbytes in the maximum size. It is split into a plurality of TS packets, multiplexed with the broadcast signal, and sent from the broadcast unit 4.

The area near the beginning of the SDTT is established as a filterable area which is filtered by software or hardware in the multiplexer 221. In tableIdExtension (tabl_id_ext) in the filterable area, the maker ID and the model ID are described.

In addition, the filterable area ranges in a few tens byte, for example, from the beginning, and this range is varied depending on the performance of a chip for use, the specifications of the receiver, etc.

Behind the filterable area, a group ID is described. Further behind the group ID, the download contents descriptors 301-1 to 301-4 are described whose value is indicted by "C9" (0xc9) in hexadecimal numbers.

The download descriptors 301-1 to 301-4 are used for describing attribute information such as the size, type and download ID of contents (update data) to be downloaded, each of which is configured of 256 bytes in the maximum size, and may be disposed in multiple numbers. In addition, in the example shown in FIG. 7, four download descriptors 301-1 to 301-4 are disposed.

In the area behind near each of the download descriptors 301-1 to 301-4, private data areas (private_data_byte) 302-1 to 302-4 are disposed. The private data areas 302-1 to 302-4 are beyond the standard in Non-Patent Reference 1, and are the area which can be used freely by the individual receivers 21 (that is, the receiver manufacturer 1). In the digital broadcasting system shown in FIG. 2, the extended model ID is described in the private data area (for example, the private data area 302-1 in the beginning download descriptor 301-1).

In addition, the extended model ID may be described not only in the private data area 302-1 in the beginning download descriptor 301-1 but also in the other private data areas in the download descriptors.

FIG. 8 shows a diagram depicting an exemplary configuration of extended model ID data described in the private data area in the download descriptor.

From the beginning of the private data area, the data of eight bits of a private ID for extended model identification (private_data_type), the data of eight bits of a data byte length for extended model identification (private_data_type_length), and the data of eight bits of an extended model ID (submodel_id) are described.

More specifically, the private data area is not defined by Non-Patent Reference 1, and the individual receivers 21 can freely use the area. Therefore, in order to allow the area for use along with other purposes at the same time, a type which indicates what is described in the private data area (the private ID for extended model identification) is described in the beginning eight bits, and a byte length (in this case, one byte) for data (that is, the extended model ID) is described in the right behind eight bits. Then, behind the byte length, the data of eight bits of an ID (sub_model_id) is described as the extended model ID.

At least one download descriptor in which data thus configured is described is placed in the SDTT. More specifically, as described above, the extended model ID is described in the SDTT, whereby the prescribed model ID as well as the combination of the model ID and the extended model ID can uniquely identify the model of a receiver.

Accordingly, a larger number of the receivers can be identified than in the case in which only the prescribed model ID is used to identify the model of a receiver.

In addition, for example, this scheme may be done in which the prescribed model ID is not determined (filtered) and only the extended model ID is used to identify the model of the receiver 21. However, in this case, the area necessary for the extended model ID is increased more than in the case of the combined use with the prescribed model ID. More specifically, the extended model ID is used in combination of the prescribed model ID to allow a large number of models of receivers to be identified with the minimum necessary area.

In addition, in the example shown in FIG. 8, the extended model ID has eight bits, but this size can be selected freely. In addition, in the private data area in which the extended model ID is described, other items of information may be described along with the extended model ID, as explained above.

FIGS. 9 and 10 show diagrams depicting an exemplary configuration of the SDTT (download notice information) in detail. In addition, in the values, those having "*" represent that different values are described depending on SDTTs.

From the beginning of the SDTT, the individual areas of eight bits of table_id, one bit of section_syntax_indicator, one bit of reserved_future_use, two bits of reserved, 12 bits of section_length, 16 bits of table_in_ext, two bits of reserved, five bits of version_number, one bit of current_next_indicator, eight bits of section_number, eight bits of last_section_number, 16 bits of transport_stream_id, 16 bits of original_network_id, 16 bits of service_id, and eight bits of num_of_contents are arranged. After the area of num_of_contents, a loop is arranged. After the loop, more specifically, at the tail of the SDTT, the area of 32 bits of CRC_32 is placed.

In the area of table_id, the value "0x03" is described which indicates that data is the table ID of the SDTT. In the area of section_syntax_indicator, the value "1" is described. In the area of reserved_future_use, the value "1" is described. In the area of reserved, the value "11" is described. In the area of section_length, the value "0x*" is described which indicates the section length (the length to CRC_32). In the area of table_in_ext, the value "0x" which indicates the maker ID (maker_id) of the receiver manufacturer 1 is described in the front area of eight bits, and the value "0x**" which indicates the model ID (model_id) is described in the back area of eight bits.

In the area of reserved, the value "11" is described. In the area of version_number, the value "***" of the version of the SDTT is described which is incremented one by one at every update. In the area of current_next_indicator, the value "0" is described which indicates not-yet-applicable, or the value "1" is described which indicates currently-applicable. In the area of section_number, the value "0x00" is described. In the area of last_section_number, the value "0x" which indicates the last section number (usually, 00) is described.

In the area of transport_stream_id, the value "0x**" is described which indicates the ID of a TS (transport stream). In the area of original_network_id, the value "0x" is described which indicates the network ID of the original distribution system. In the area of service_id, the value "0x" is described which indicates the service (channel) ID which downloads (transmits) software contents (update data). In the area of num_of_contents, the value "0x" is described which indicates the number of download targets of software notified in the SDTT.

In addition, in the receiver 21, among these areas, the areas from the beginning table_id to last_section_number, for example, are the filterable area in the multiplexer 221.

In the large loop after the area of num_of_contents, the areas of four bits of group, 12 bits of target_version, 12 bits of new_version, two bits of download_level, two bits of version_ indicator, 12 bits of content_description_length, four bits of reserved, 12 bits of schedule_description_length, and four bits of reserved are arranged. After that, a schedule loop and a descriptor loop are arranged.

In the area of group, the value "0x*" is described which indicates the group ID (group_id). In the area of target_version, the value "0x*" is described which indicates the version of the software number to be an update target. In the area of new_version, the value "0x*" is described which indicates the version of the software number for download at this time. In the area of download_level, the value "00" is described which indicates random download, or the value "01" is described which indicates compulsory download.

In the area of version_indicator, described is the value "00" which indicates that the all versions are targets (the version specification (target_version) is invalid), the value "01" which indicates that the version after the specified version are targets, the value "10" which indicates that the version before the specified version are targets, or the value "11" which indicates that only the specified version is a target.

In the area of content_description_length, the value "0x*" is described which indicates the sum of bytes of the schedule loop and the descriptor loop. In the area of reserved, the value "0xF" (that is, 1 is described for all four bits) is described. In the area of schedule_description_length, the value "0x*" is described which indicates the byte number of the schedule loop. When the value is 0, it is indicated that the download contents (update data) are being transmitted. In the area of reserved, the value "0xF" (that is, 1 is described for all four bits) is described.

In the first loop (schedule loop), the areas of 40 bits of start_time and 24 bits of duration are arranged.

In the area of start_time, the value "0x********" is described which indicates the distribution start time for download at Japanese Standard Time (JST) and Modified Julian Day (MJD). In the area of duration, the value "0x****" is described which indicates the distribution duration to be a period to distribute update data.

In the second loop (descriptor loop), the area of descriptors ( ) is arranged in which the download contents descriptor (DCD) is indicated by the value "0xC9".

FIGS. 11 and 12 show diagrams depicting the configuration of the download contents descriptor.

From the beginning download contents descriptor, the areas of eight bits of description_tag, eight bits of descriptor_length, one bit of reboot, one bit of add_on, one bit of compatibility_flag, one bit of module_info_flag, one bit of text_info_flag, three bits of reserved, 32 bits of component_size, 32 bits of download_id, 32 bits of time_out_value_DII, 22 bits of leak_rate, two bits of reserved, eight bits of component_tag are arranged.

In the area of descriptor_tag, the value "0xC9" is described which indicates the tag value of the download contents descriptor. In the area of descriptor_length, the value "0x**" is described which indicates the length of this descriptor. In the area of reboot, the value "0" is described which indicates that the receiver is continuously operated after download is finished, or the value "1" is described which indicates that the receiver is rebooted after download is finished. In the area of add_on, the value "0" is described which indicates that the software update method is write for the existing module, or the value "1" is described which indicates that the software update method is the addition of the existing module.

In the area of compatibility_flag, the value "0" is described which indicates that the descriptor does not have compatibility_descriptor( ), or the value "1" is described which indicates that the descriptor has compatibility_descriptor( ). In the area of module_info_flag, the value "0" is described which indicates that the descriptor does not have information about every module, or the value "1" is described which indicates that the descriptor has information about every module. In the area of text_info_flag, the value "0" is described which indicates that the descriptor does not have service description at the tail, or the value "1" is described which indicates that the descriptor has service description at the tail.

In the area of reserved, the value "111" indicating 1 is described. In the area of component_size, the value "0x******" is described which indicates that the sum of transmitted data size in the data carousel is represented in units of bytes. In the area of download_id, the value "0x****" of the ID is described which identifies the download reception number. In the area of time_out_value_DII, the value "0x******" is described which indicates the timeout value to be recommended for reception in all the sections of DII (Download Info Indication) that is one of messages of download control in the carousel of interest.

In the area of leak_rate, the value ",0x*" is described which indicates the leak rate of the TS (transport stream) buffer of the receiver 21 in a unit of 50 bytes. In the area of reserved, the value "11" indicating 1 is described. In the area of component_tag, the value "" is described which indicates the component tag value of the corresponding stream given by the stream descriptor of a PMT (Program Map Table).

After the area of component_tag, a module loop, and the area of eight bits of private_data_length, and a private loop are arranged. However, the area of compatibility_descriptor ( ) is arranged between the area of component_tag and the module loop only when compatibility_flag has the value "1", and the area of 16 bits of num_of_modules is arranged therebetween only when module_info_flag has the value "1".

In the area of compatibility_descriptor( ), descriptors are described which relates to compatibility fully equivalent to those in DII. In the area of num_of_modules, the value "****" is described which indicates the number of modules used for data transmission in download.

In the module loop, the areas of 16 bits of module_id, 32 bits of module_size, eight bits of module_info_length, are arranged, and a loop after the areas. In the area of module_id, the value "**" is described which indicates the module ID used for data transmission in download. In the area of module_size, the value "****" is described which indicates the byte length of the module of interest. In the area of module_info_length, the value "" is described which indicates the byte length of module_info_byte in the subsequent loop.

In the area of eight bits of module_info_byte in the loop, a necessary descriptor is described among the type descriptor, name descriptor, and the info descriptor described in the DII.

In the area of private_data_length after the module loop, the value "**" is described which indicates the byte length of private_data_byte in the subsequent private loop.

In the area of the module loop, the area of eight bits of private_data_byte is arranged. After that, only when text_info_flag has the value "1", the areas of 24 bits of ISO_639_language_code and eight bits of text_length and a loop having the area of eight bits of text_char are arranged.

In the area of private_data_byte (private data area) is beyond the range of the standard. In the digital broadcasting system shown in FIG. 2, the extended model ID is described in the area of private_data_byte in the configuration described with reference to FIG. 8.

In the area of ISO_639_language_code, the value [****] is described which identifies the language for character description for use in service description at the tail. In the area of text_length, the value "" is described which indicates the byte length of service description at the tail. In the area of text_char (service description area), description is made relating to the service for the download contents (update data) to be transmitted.

In addition, the explanation above, the extended model ID is described in the private data area of the download contents descriptor, but it may be described in the other areas as long as the areas are not used in the current standard, not limited to that area.

For example, other than the private data area of the download contents descriptor, the extended model ID may be described in the area of text_char (service description area) of the download contents descriptor, the area of group (the group area) of the SDTT, or other areas of reserved, for example.

In addition, the area of text_char (service description area) of the download contents descriptor is the area in which description is made relating to the service of the download contents (update data) to be transmitted. The area of group (group area) of the SDTT is the area defined by STD-B21 in Non-Patent Reference 1 which is intended to distribute the download start time for every receiver and to reduce the load of power plants. In addition, since the other areas of reserved are the areas which are reserved for future use, these areas may be used for other purposes in future. This scheme may be done in which the extended model ID is described in these areas, but in consideration of the explanation above, the private data area of the download contents descriptor is the most recommended area for description of the extended model ID.

Figure 13:
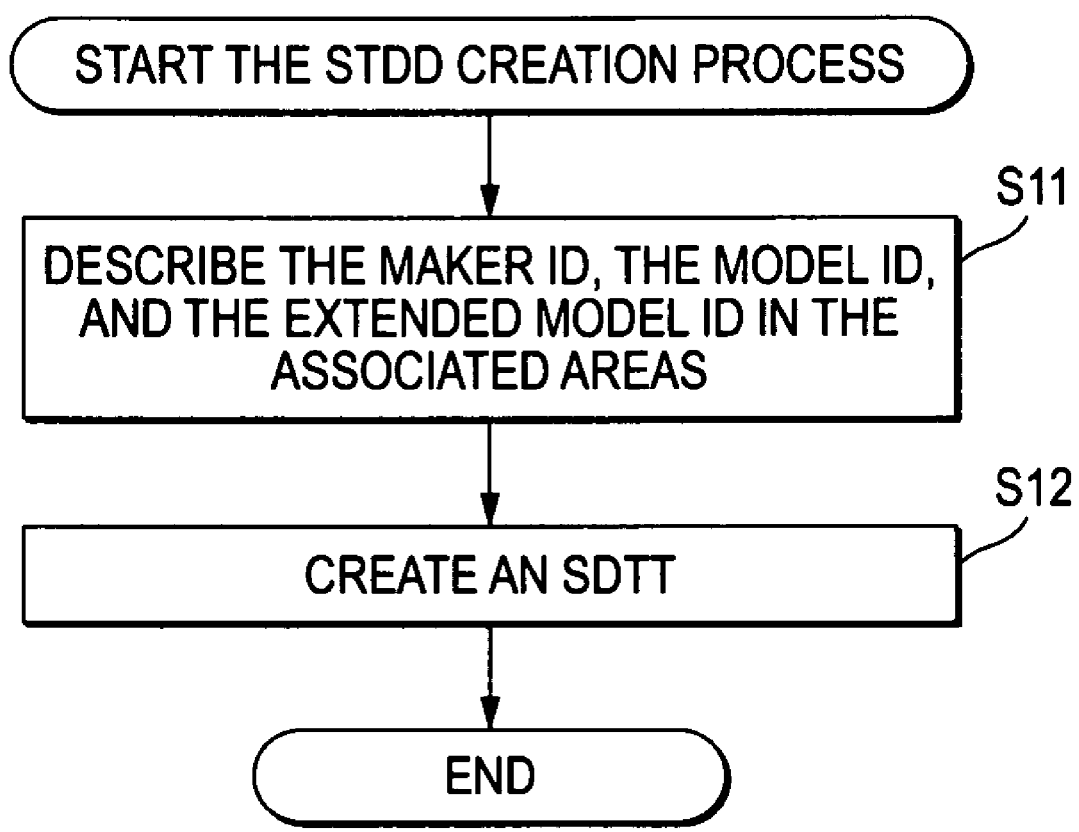
FIG. 13 shows a flow chart illustrative of an SDTT creation process done by a data generating unit shown in FIG. 2.

Next, an SDTT creation process done by the data generating unit 11 will be described with reference to a flow chart shown in FIG. 13.

The receiver manufacturer 1 manipulates the keyboard and the other devices configuring the input part 116, and enters information (the maker ID as well as the model ID, the extended model ID and the others established by the receiver manufacturer 1) to be described in the SDTT on the receiver manufacturer 11 side.

When information associated with the manipulation done by the receiver manufacturer 1 is inputted from the input part 116, the information description part 151 describes information (the maker ID as well as the model ID and the extended model ID and others established by the receiver manufacturer 1) to be described in the SDTT on the receiver manufacturer 1 side in the associated areas at Step S11.

For example, the maker ID and the model ID are described in tabeldExtension near the beginning of the SDTT. In addition, the extended model ID is described in the private data area of the download contents descriptor (private_data_byte) of the SDTT, for example.

The information description part 511 supplies data in which information to be described in the SDTT on the receiver manufacturer 1 side is all described to the notice information generating part 152.

At Step 12, the notice information generating part 152 converts data supplied from the information description part 151 to the SDTT format to create an SDTT.

Thus, the created SDTT is transmitted (provided) to the download unit 3 along with update data created by a process, not shown, so that the download unit 3 collects update data provided by the receiver manufacturers 1-1 and 1-2 for scheduling.

Then, before update data is transmitted as download data (data carousel), the download unit 3 describes and completes necessary information (for example, download information such as the download time for update data and the service (channel) to provide download as information that notifies the receiver in advance that update data for software is to be downloaded) based on update data in the SDTT provided by the receiver manufacturers 1-1 and 1-2, and multiplexes the completed SDTT with the broadcast signal for transmission through the broadcast unit 4.

After that, the download unit 3 multiplexes update data as download data (data carousel) with the broadcast signal at the download time for update data for transmission through the broadcast unit 4.

Next, a process will be described with reference to a flow chart shown in FIG. 14 in which the receiver 21 acquires data and updates software based on the SDTT.

As described above, in an update of the software in the receiver 21, prior to transmission (broadcasting) of update data, the SDTT (software download trigger information table) is broadcast through the download unit 3 and the broadcast unit 4.

The front end part 219 in the receiver 21 extracts the broadcast signal corresponding to the channel selected by a user from the broadcast signal received through the antenna 201, demodulates it to create a transport stream, and outputs it to the descrambler 220. The descrambler 220 properly descrambles the transport stream inputted from the front end part 219, and outputs it to the demultiplexer 221.

The demultiplexer 221 isolates the multiplexed transport stream into a video or sound data stream and section data. Then, at Step S41, the demultiplexer 221 filters the isolated section data using the table ID, the maker ID, and the model ID as parameters. When it identifies that the data is the SDTT, at Step S42, it determines whether the maker ID and the model ID described in the SDTT are matched with the maker ID and the model ID corresponding to the receiver 21.

At Step S42, when it is determined that the maker ID and the model ID described in the SDTT are matched with the maker ID and the model ID corresponding to the receiver 21, the demultiplexer 221 outputs the SDTT to the notice information acquiring part 251 of the CPU 211.

At Step S43, the notice information acquiring part 251 acquires the SDTT from the demultiplexer 221, and temporarily decompresses the acquired SDTT over the RAM 213.

At Step S44, under the control by the notice information acquiring part 251, the extended ID determining part 261 references to the extended model ID in the nonvolatile memory 215, and it determines whether the extended model ID is described in the SDTT. When it determines that the extended model ID is described in the SDTT, at Step S45, it is determined whether the extended model ID described in the SDTT is matched with the extended model ID owned by the receiver 21.

At Step S45, it is determined that the extended model ID described in the SDTT is matched with the extended model ID owned by the receiver 21, at Step S46, under the control by the notice information acquiring part 251, the version determining part 262 references to the version of software information in the nonvolatile memory 215, and it determines whether the version of update data described in the SDTT is the necessary version for the receiver 21.

When the version described in the SDTT is greater (newer) than the version of software of the receiver 21, at Step S46, it is determined that the version described in the SDTT is the necessary version. Therefore, the notice information acquiring part 251 stores the SDTT decompressed over the RAM 213 in the nonvolatile memory 215.

On the other hand, when it is determined that the maker ID and the model ID described in the SDTT are not matched with the maker ID and the model ID corresponding to the receiver 21 at Step S42, when it is determined that the extended model ID is not described in the SDTT at Step S44, when it is determined that the extended model ID described in the SDTT is not matched with the extended model ID owned by the receiver 21 at Step S45, or when it is determined that the version described in the SDTT is not the necessary version at Step S46, the SDTT decompressed over the RAM 213 is discarded by the notice information acquiring part 251. The process returns to Step S41, and the process steps for the section data subsequently broadcast is conducted.

When the SDTT is stored in the nonvolatile memory 215, at Step S47, the update data acquiring part 252 analyzes information described in the SDTT, and at Step S48, it prepares download for update data.

More specifically, the update data acquiring part 252 analyzes information described in the SDTT to confirm download information such as the download start time for update data and the service (channel) to provide download, decides the download start time for update data to do clock operation by the clock built therein, and waits until it is the download start time for update data described in the SDTT.

When the update data acquiring part 252 determines that it is the download start time for update data, at Step S49, it conducts a software update process. The software update process will be described with reference to a flow chart shown in FIG. 15.

At Step S71, the update data acquiring part 252 controls the channel selecting part 253 to select the download service (channel) described in the SDTT. At Step S72, it controls the demultiplexer 221 to acquire the necessary version of update data for the receiver 21 from the broadcast signal of the service selected by the channel selecting part 253, and temporarily stores the acquired update data in the nonvolatile memory 215.

More specifically, at the broadcast date and time for update data (the download start time), update data for software is transmitted as download data (data carousel) from the broadcast unit 4, which is multiplexed with the broadcast signal of a predetermined service. In addition, the contents may be encoded, or may be added with error detection codes and error correcting codes in order to prevent transmission error.

The front end part 219 receives the broadcast signal from the broadcast unit 4 through the antenna 201. Thus, the channel selecting part 254 controls the front end part 219 to select the service (channel) described in download notice information from the received broadcast signal. The front end part 219 extracts the broadcast signal corresponding to the channel selection done by the channel selecting part 254 from the broadcast signal received through the antenna 201, demodulates it to create a transport stream, and outputs it to the descrambler 220. The descrambler 220 properly descrambles the transport stream inputted from the front end part 219, and outputs it to the demultiplexer 221.

The demultiplexer 221 isolates the multiplexed transport stream into a stream such as video or sound data and into section data, and supplies a necessary DSM-CC section as update data to the update data acquiring part 252 from the isolated section data under control by the update data acquiring part 252.

At Step S72, the update data acquiring part 252 acquires update data from the demultiplexer 221, and temporarily stores it in the nonvolatile memory 215.

At Step S73, the software update part 254 uses update data stored in the nonvolatile memory 215 by the update data acquiring part 252, and updates software in the receiver 21. Then, the process of the receiver 21 is ended.

Figure 14:
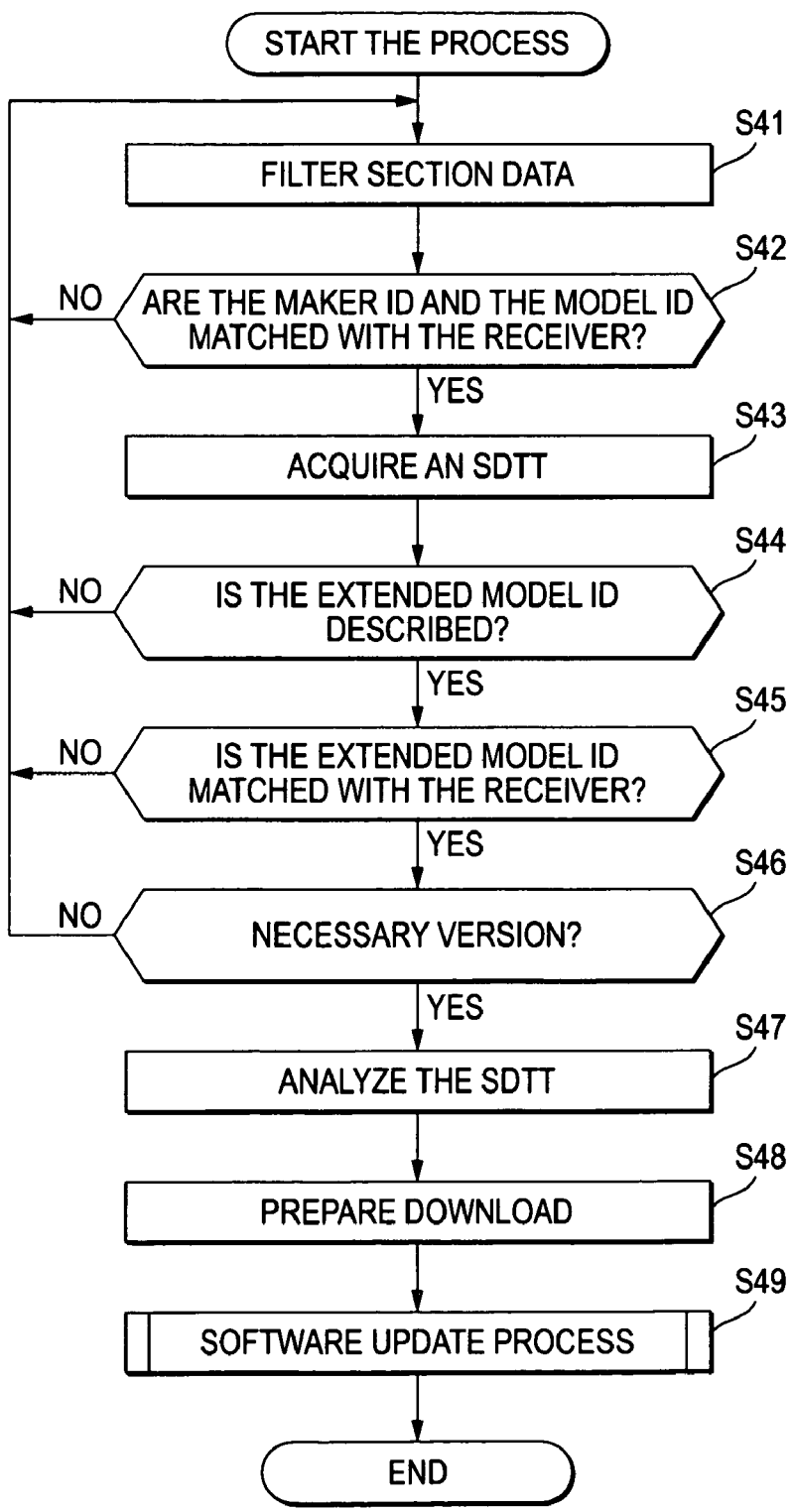
FIG. 14 shows a flow chart illustrative of processes done by a receiver shown in FIG. 2.
Figure 15:
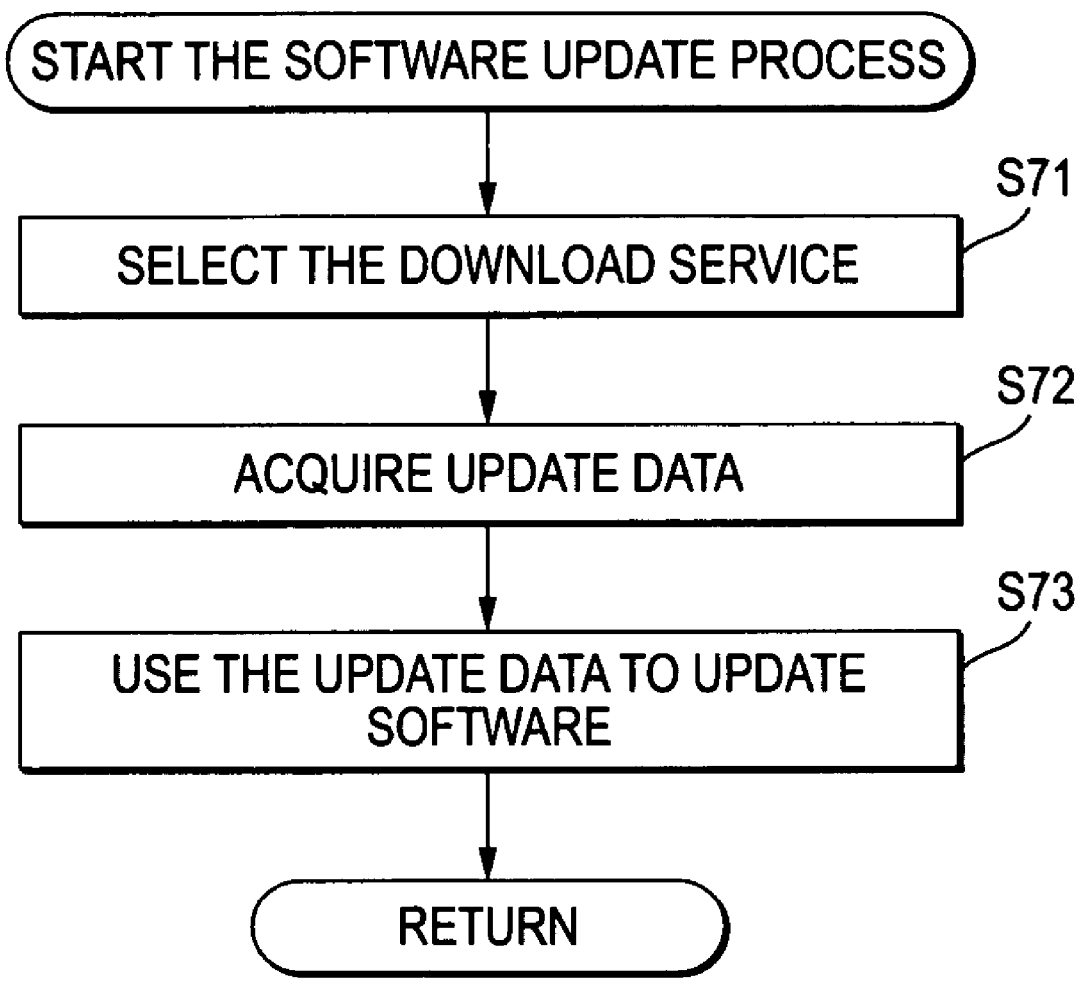
FIG. 15 shows a flow chart illustrative of a software update process at Step S49 shown in FIG. 14.

In addition, in the example shown in FIG. 14, the case is discussed in which the extended ID is determined at Steps S44 and S45 and then the version determination process is conducted at Step S46. However, the version determination process may be conducted before the extended ID determination process.

As described above, the model of the receiver 21 is identified not only by the prescribed model ID but also the combination of the model ID and the extended model ID. Therefore, a larger number of receivers can be identified than in the case in which only the prescribed model ID is used to identify the models of receivers.

In addition, the combination of the model ID and the extended model ID is used to identify the model of the receiver 21, not the use of a new model ID. Therefore, the area necessary for the extended model ID is also made minimum.

Moreover, the extended model ID is described in the area not currently defined. Therefore, the constraints of the finite number of model IDs can be relaxed in accordance with the standard of current Non-Patent Reference 1, and the receiver manufacturer 1 can supply the variety of receivers in the market.

More specifically, according to an embodiment of the invention, it can suppress the risk that model IDs may be used out within one to two decades and new models of receivers may not be supplied in the case of using only the prescribed model ID before.

More specifically, for example, when it is supposed that 20 models go on the market per year, the model IDs are likely to be used out for a decade or so in the case of only using the prescribed model ID before. However, according to an embodiment of the invention, in the case in which the extended model ID has eight bits, for example, the combination of the model ID and the extended model ID can be used with no overlap over a millennium.

In addition, in the discussion, update data is multiplexed with the broadcast signal and acquired from the broadcast signal, but it may be acquired from a server through a network, not shown.

In addition, in the discussion, the receiver 21 having the display 202 built therein is used for explanation. However, it may be a receiver connected to an external television set, or may be configured of a set top box. In addition, in the discussion, the receiver 21 of the fixed receiver type is used for explanation. However, an embodiment of the invention can be adapted to a mobile receiver such as a PDA (Personal Digital Assistant) and a cellular telephone and to a portable receiver.

The sequence of the process steps described above can be executed by hardware, but may be executed by software. When the sequence of process steps is executed by software, a program configuring the software is installed through a program storage medium in a computer which is installed in hardware exclusive for use, or in a general purpose personal computer, for example, which can execute various functions by installing various programs.

The program storage medium which stores a program that is installed in a computer and is made executable by the computer is configured of the removal media (package media) 121 and 225, as shown in FIGS. 3 and 5, formed of a magnetic disc (including a flexible disc), an optical disc (including CD-ROM (Compact Disc-Read Only Memory), DVD (Digital Versatile Disc)), a magneto-optical disc (including MD (Mini-Disc)™) or a semiconductor memory, or the ROM 112 and the ROM 212 in which a program is temporarily or permanently stored.

In addition, in the present specification, steps in the flow charts of course include process steps done in time series in described order, as well as include process steps done in parallel or separately, not done in time series.

In addition, in the specification, the system represents overall equipment configured of a plurality of devices.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing system, comprising:
a receiving apparatus which receives a broadcast signal; and
a data generating unit which creates notice information relating to download for update data multiplexed with the broadcast signal for transmission and that updates software in the receiving apparatus, the data generating unit including:
means for describing information which describes a prescribed model ID defined by a predetermined standard in order to uniquely identify a model of the receiving apparatus in a prescribed area in the notice information defined by the predetermined standard and which describes an extended model ID used in combination with the prescribed model ID to uniquely identify a larger number of models of the receiving apparatus than the number of the prescribed model IDs in a predetermined area in the notice information; and
means for generating the notice information in which the prescribed model ID and the extended model ID are described by the means for describing information, and
the receiving apparatus including:
means for determining a prescribed ID which determines whether the prescribed model ID in the notice information multiplexed with the broadcast signal matches a prescribed model ID owned by the receiving apparatus;
means for determining an extended ID which determines whether the extended model ID in the notice information matches the owned extended model ID when it is determined that the prescribed model ID in the notice information matches the owned prescribed model ID; and
means for acquiring update data from the broadcast signal based on the notice information when it is determined that the extended model ID in the notice information matches the owned extended model ID.

2. The information processing system according to claim 1, wherein the receiving apparatus further comprises:
means for discarding information which discards the notice information when it is determined that the extended model ID in the notice information does not match the owned extended model ID.

3. The information processing system according to claim 1, wherein the means for describing information describes the extended model ID in a predetermined area which is arranged behind more than the prescribed area in which the prescribed model ID is described and which is not defined or not used by the predetermined standard in the notice information.

4. The information processing system according to claim 3, wherein the predetermined area in which the extended model ID is described is a private data area.

5. The information processing system according to claim 1, wherein the receiving apparatus further comprises:
means for updating software which uses the acquired update data to update owned software.

6. An information processing method of an information processing system including a receiving apparatus which receives a broadcast signal, and a data generating unit which creates notice information relating to download for update data multiplexed with the broadcast signal for transmission and that updates software in the receiving apparatus, the information processing method comprising:
in the data generating unit,
describing information to describe a prescribed model ID defined by a predetermined standard in order to uniquely identify a model of the receiving apparatus in a prescribed area in the notice information defined by the predetermined standard and to describe an extended model ID used in combination with the prescribed model ID to uniquely identify a larger number of models of the receiving apparatus than the number of the prescribed model IDs in a predetermined area in the notice information; and
generating the notice information in which the prescribed model ID and the extended model ID are described by the process of describing information, and
in the receiving apparatus,
determining a prescribed ID to determine whether the prescribed model ID in the notice information multiplexed with the broadcast signal matches a prescribed model ID owned by the receiving apparatus;

determining an extended ID to determine whether the extended model ID in the notice information matches the owned extended model ID when it is determined that the prescribed model ID in the notice information matches the owned prescribed model ID; and acquiring update data from the broadcast signal based on the notice information when it is determined that the extended model ID in the notice information matches the owned extended model ID.

7. A receiving apparatus which receives notice information relating to download for update data created by a data generating unit and multiplexed with a broadcast signal and that updates software, the receiving apparatus comprising:

means for determining a prescribed ID which determines whether a prescribed model ID in the notice information multiplexed with the broadcast signal matches an owned prescribed model ID, wherein the prescribed model ID defined by a predetermined standard in order to uniquely identify a model of the receiving apparatus is described in a prescribed area in the notice information defined by the predetermined standard, and an extended model ID used in combination with the prescribed model ID to uniquely identify a larger number of models of the receiving apparatus than the number of the prescribed model IDs is described and created in a predetermined area in the notice information;

means for determining an extended ID which determines whether the extended model ID in the notice information matches the owned extended model ID when it is determined that the prescribed model ID in the notice information matches the owned prescribed model; and means for acquiring update data from the broadcast signal based on the notice information when it is determined that the extended model ID in the notice information matches the owned extended model ID.

8. The receiving apparatus according to claim 7, further comprising:

means for discarding information which discards the notice information when it is determined that the extended model ID in the notice information does not match the owned extended model ID.

9. The receiving apparatus according to claim 7, wherein the extended model ID is described in a predetermined area which is arranged behind more than the prescribed area in which the prescribed model ID is described and which is not defined or not used by the predetermined standard in the notice information.

10. The receiving apparatus according to claim 9, wherein the predetermined area in which the extended model ID is described is a private data area.

11. The receiving apparatus according to claim 7, further comprising:

means for updating software which uses the acquired update data to update owned software.

12. A receiving method of a receiving apparatus which receives notice information relating to download for update data created by a data generating unit and multiplexed with a broadcast signal and that updates software, the method comprising:

determining a prescribed ID to determine whether a prescribed model ID in the notice information multiplexed with the broadcast signal matches an owned prescribed model ID, wherein the prescribed model ID defined by a predetermined standard in order to uniquely identify a model of the receiving apparatus is described in a prescribed area in the notice information defined by the predetermined standard, and an extended model ID used in combination with the prescribed model ID to uniquely identify a larger number of models of the receiving apparatus than the number of the prescribed model IDs is described and created in a predetermined area in the notice information;

determining an extended ID to determine whether the extended model ID in the notice information matches the owned extended model ID when it is determined that the prescribed model ID in the notice information matches the owned prescribed model ID; and acquiring update data from the broadcast signal based on the notice information when it is determined that the extended model ID in the notice information matches the owned extended model ID.

13. A processor readable medium having processor control instructions comprising a program of a receiving apparatus which receives notice information relating to download for update data created by a data generating unit and multiplexed with a broadcast signal and that updates software, the program comprising:

determining a prescribed ID to determine whether a prescribed model ID in the notice information multiplexed with the broadcast signal matches an owned prescribed model ID, wherein the prescribed model ID defined by a predetermined standard in order to uniquely identify a model of the receiving apparatus is described in a prescribed area in the notice information defined by the predetermined standard, and an extended model ID used in combination with the prescribed model ID to uniquely identify a larger number of models of the receiving apparatus than the number of the prescribed model IDs is described and created in a predetermined area in the notice information;

determining an extended ID to determine whether the extended model ID in the notice information matches the owned extended model ID when it is determined that the prescribed model ID in the notice information matches the owned prescribed model ID; and acquiring update data from the broadcast signal based on the notice information when it is determined that the extended model ID in the notice information matches the owned extended model ID.

14. A data generating unit which creates notice information relating to download for update data multiplexed with a broadcast signal for transmission and that updates software in a receiving apparatus which receives a broadcast signal, the data generating unit comprising:

means for describing information which describes a prescribed model ID defined by a predetermined standard in order to uniquely identify a model of the receiving apparatus in a prescribed area in the notice information defined by the predetermined standard and which describes an extended model ID used in combination with the prescribed model ID to uniquely identify a larger number of models of the receiving apparatus than the number of the prescribed model IDs in a predetermined area in the notice information; and means for generating the notice information in which the prescribed model ID and the extended model ID are described by the means for describing information.

15. The data generating unit according to claim 14, wherein the means for describing information describes the extended model ID in a predetermined area which is arranged behind more than the prescribed area in which the prescribed model ID is described and which is not defined or not used by the predetermined standard in the notice information.

16. The data generating unit according to claim 15, wherein the predetermined area in which the extended model ID is described is a private data area.

17. A data generating method of a data generating unit which creates notice information relating to download for update data multiplexed with a broadcast signal for transmission and that updates software in a receiving apparatus which receives a broadcast signal, the data generating method comprising:

describing information to describe a prescribed model ID defined by a predetermined standard in order to uniquely identify a model of the receiving apparatus in a prescribed area in the notice information defined by the predetermined standard and to describe an extended model ID used in combination with the prescribed model ID to uniquely identify a larger number of models of the receiving apparatus than the number of the prescribed model IDs in a predetermined area in the notice information; and generating the notice information in which the prescribed model ID and the extended model ID are described by the process of describing information.

18. A processor readable medium having processor control instructions comprising a program which allows a computer to execute a process of generating notice information relating to download for update data multiplexed with a broadcast signal for transmission and that updates software in a receiving apparatus which receives a broadcast signal, the program comprising:

describing information to describe a prescribed model ID defined by a predetermined standard in order to uniquely identify a model of the receiving apparatus in a prescribed area in the notice information defined by the predetermined standard and to describe an extended model ID used in combination with the prescribed model ID to uniquely identify a larger number of models of the receiving apparatus than the number of the prescribed model IDs in a predetermined area in the notice information; and generating the notice information in which the prescribed model ID and the extended model ID are described by the process of describing information.

19. An information processing system, comprising:

a receiving apparatus which receives a broadcast signal; and a data generating unit which creates notice information relating to download for update data multiplexed with the broadcast signal for transmission and that updates software in the receiving apparatus, the data generating unit including:

a device operable to describe information which describes a prescribed model ID defined by a predetermined standard in order to uniquely identify a model of the receiving apparatus in a prescribed area in the notice information defined by the predetermined standard and which describes an extended model ID used in combination with the prescribed model ID to uniquely identify a larger number of models of the receiving apparatus than the number of the prescribed model IDs in a predetermined area in the notice information; and a device operable to generate the notice information in which the prescribed model ID and the extended model ID are described by the device operable to describe information, and the receiving apparatus including:

a device operable to determine a prescribed ID which determines whether the prescribed model ID in the notice information multiplexed with the broadcast signal matches a prescribed model ID owned by the receiving apparatus;

a device operable to determine an extended ID which determines whether the extended model ID in the notice information matches the owned extended model ID when it is determined that the prescribed model ID in the notice information matches the owned prescribed model ID; and a device operable to acquire update data from the broadcast signal based on the notice information when it is determined that the extended model ID in the notice information matches the owned extended model ID.

* * * * *